US012221586B2

(12) United States Patent
Madigan

(10) Patent No.: US 12,221,586 B2
(45) Date of Patent: Feb. 11, 2025

(54) ENHANCED GASIFICATION SYSTEM AND METHOD

(71) Applicant: Aether Fuels Pte. Ltd., Singapore (SG)

(72) Inventor: Conor F. Madigan, San Francisco, CA (US)

(73) Assignee: AETHER FUELS PTE. LTD., Singapore (SG)

( * ) Notice: Subject to any disclaimer, the term of this patent is extended or adjusted under 35 U.S.C. 154(b) by 0 days.

(21) Appl. No.: 18/151,046

(22) Filed: Jan. 6, 2023

(65) Prior Publication Data

US 2024/0141242 A1 May 2, 2024

Related U.S. Application Data

(60) Provisional application No. 63/381,065, filed on Oct. 26, 2022.

(51) Int. Cl.
*C10J 3/72* (2006.01)
*C01B 3/12* (2006.01)
(Continued)

(52) U.S. Cl.
CPC ............... *C10J 3/723* (2013.01); *C01B 3/12* (2013.01); *C01B 3/36* (2013.01); *C10J 3/84* (2013.01);
(Continued)

(58) Field of Classification Search
CPC . C10J 3/723; C10J 3/84; C10J 2300/06; C10J 2300/092; C10J 2300/0959;
(Continued)

(56) References Cited

U.S. PATENT DOCUMENTS 3,980,590 A * 9/1976 Marion .................. C01B 32/00
48/212
4,211,540 A * 7/1980 Netzer ....................... C10J 3/06
518/703

(Continued)

FOREIGN PATENT DOCUMENTS

JP 2014510163 A * 4/2014 ...... C10J 2300/1815
WO 2007037768 A1 4/2007
(Continued)

OTHER PUBLICATIONS

Lu et al., "Gasification of coal and biomass as a net carbon-negative power source for environment-friendly electricity generation in China", PNAS, Apr. 2, 20193, vol. 116, No. 17, pp. 8206-8213, Apr. 23, 2019.
(Continued)

*Primary Examiner* — Kaity V Chandler
(74) *Attorney, Agent, or Firm* — Hauptman Ham, LLP

(57) ABSTRACT

Method and apparatus for converting waste solid sustainable carbon material to chemical products is described herein. The methods add hydrocarbon derived from fossil sources to gas derived from gasifying waste solid sustainable carbon material to enhance hydrogen availability, and in some cases carbon availability, for production of the chemical products. Carbon dioxide made by the process is at least partially sequestered to yield a chemical manufacturing process with environmental burden substantially less than conventional processes. Use of the hydrocarbon boosts yield of final products.

10 Claims, 13 Drawing Sheets

(51) Int. Cl.
   *C01B 3/36* (2006.01)
   *C10J 3/84* (2006.01)
   *C10K 3/00* (2006.01)

(52) U.S. Cl.
   CPC .......... *C10K 3/00* (2013.01); *C01B 2203/025* (2013.01); *C01B 2203/0283* (2013.01); *C01B 2203/04* (2013.01); *C01B 2203/06* (2013.01); *C01B 2203/1241* (2013.01); *C01B 2203/86* (2013.01); *C10J 2300/06* (2013.01); *C10J 2300/092* (2013.01); *C10J 2300/0959* (2013.01); *C10J 2300/0969* (2013.01); *C10J 2300/0976* (2013.01); *C10J 2300/1612* (2013.01); *C10J 2300/1618* (2013.01); *C10J 2300/1656* (2013.01); *C10J 2300/1815* (2013.01)

(58) Field of Classification Search
   CPC ........ C10J 2300/0969; C10J 2300/0976; C10J 2300/1612; C10J 2300/1618; C10J 2300/1656; C10J 2300/1815; C01B 3/12; C01B 3/36; C01B 2203/025; C01B 2203/0283; C01B 2203/04; C01B 2203/06; C01B 2203/1241; C01B 2203/86; C10K 3/00

See application file for complete search history.

(56) References Cited

U.S. PATENT DOCUMENTS

| | | | | |
|---|---|---|---|---|
| 4,462,928 | A * | 7/1984 | Dille | C01B 3/36 203/52 |
| 4,490,156 | A * | 12/1984 | Marion | C10J 3/466 431/90 |
| 5,066,476 | A * | 11/1991 | Wetzel | C10K 1/02 48/197 R |
| 9,243,196 | B2 | 1/2016 | Bryan et al. | |
| 11,168,339 | B1 * | 11/2021 | Stepany | C12P 5/023 |
| 11,512,402 | B2 * | 11/2022 | Bairamijamal | C07C 41/01 |
| 2007/0256360 | A1 | 11/2007 | Kindig | |
| 2008/0115415 | A1 | 5/2008 | Agrawal | |
| 2010/0071262 | A1 | 3/2010 | Robinson | |
| 2010/0120926 | A1 * | 5/2010 | Robinson | C10K 1/004 518/703 |
| 2010/0179232 | A1 * | 7/2010 | Robinson | C10L 3/102 518/703 |
| 2010/0287836 | A1 * | 11/2010 | Robinson | C01B 3/52 48/127.7 |
| 2011/0218254 | A1 * | 9/2011 | Chakravarti | C10J 3/463 518/700 |
| 2013/0137151 | A1 * | 5/2013 | Tobey | C12P 7/08 252/373 |
| 2014/0148519 | A1 | 5/2014 | Drnevich | |
| 2014/0224706 | A1 | 8/2014 | Do | |
| 2015/0073188 | A1 | 3/2015 | Floudas | |
| 2015/0299589 | A1 * | 10/2015 | Bryan | C01B 3/48 252/373 |
| 2015/0315481 | A1 | 11/2015 | Steve | |
| 2018/0291278 | A1 * | 10/2018 | Jack | C10J 3/466 |
| 2019/0084833 | A1 | 3/2019 | Weedon | |
| 2021/0317375 | A1 | 10/2021 | Greager | |
| 2021/0363080 | A1 * | 11/2021 | Galebach | B01J 23/002 |
| 2022/0099003 | A1 * | 3/2022 | Lu | C01B 3/50 |
| 2022/0112429 | A1 | 4/2022 | Greager | |
| 2022/0119715 | A1 | 4/2022 | Greager | |

FOREIGN PATENT DOCUMENTS

| | | |
|---|---|---|
| WO | 2021185827 A1 | 9/2021 |
| WO | 2021228774 A1 | 11/2021 |

OTHER PUBLICATIONS

Seifkar et al., "Biomass to Liquid Fuels Pathways: A Techno-Economic Environmental Evaluation", An MIT Energy Initiative Report, Mar. 2015.

International Search Report and Written Opinion mailed Feb. 14, 2024 for International Application No. PCT/US2023/035844.

International Search Report and Written Opinion mailed Feb. 23, 2024 for International Application No. PCT/US2023/032339.

International Search Report and Written Opinion mailed Nov. 14, 2023 for International Application No. PCT/US2023/052006.

International Search Report and Written Opinion mailed Sep. 22, 2023 for International Application No. PCT/IB2023/050119.

* cited by examiner

| Methanol | CASE 3A Methanol 100 Prior Art | CASE 3B Methanol 200A Net Zero GHG LCA | CASE 3C Methanol 200A 20% of fossil GHG LCA | CASE 3D Methanol 200A -50% of fossil GHG LCA | |
|---|---|---|---|---|---|
| FLOW CALCULATIONS | | | | | |
| BLOCK 104 and 204 | | | | | |
| NG Input to converter | 0 | 246 | 350 | 101 | mt/d |
| Gasification stage effluent - CO | 505 | 828 | 964 | 638 | mt/d |
| Gasification stage effluent - CO2 | 595 | 764 | 836 | 665 | mt/d |
| Gasification stage effluent - H2 | 27 | 73 | 93 | 46 | mt/d |
| BLOCK 112, 212, 212B, and 212C | | | | | |
| Portion of gasification stage effluent routed to CO converter | 43% | 27% | 23% | 34% | |
| Portion of converted stream routed to CO2 removal | 100% | 100% | 100% | 100% | |
| CO2 recycled to gasification stage from CO2 removal unit | 135 | 135 | 135 | 135 | mt/d |
| CO2 directed into sequestration from CO2 removal unit | 752 | 920 | 992 | 821 | mt/d |
| CO2 leakage from CO2 removal unit | 47 | 56 | 59 | 50 | mt/d |
| Methanol plant (i.e. conversion stage) Input - CO | 290 | 608 | 742 | 420 | mt/d |
| Methanol plant (i.e. conversion stage) Input - CO2 | 0 | 0 | 0 | 0 | mt/d |
| Methanol plant (i.e. conversion stage) Input - H2 | 42 | 89 | 109 | 62 | mt/d |
| BLOCK 126 or 226 | | | | | |
| Methanol Product Output | 318 | 667 | 814 | 461 | mt/d |
| EMBODIMENT METRICS | | | | | |
| Methanol Product Output relative to conventional case | 100% | 210% | 256% | 145% | |
| Portion of Fossil Carbon in Methanol Product Output | 0% | 39% | 48% | 21% | |
| Volumetric Flow Rate in gasification stage effluent relative to conventional case | 100% | 185% | 221% | 135% | |
| % of net atomic carbon input into process from fossil sources | 0% | 32% | 41% | 16% | |
| Sustainable atomic carbon input into process | 386 | 386 | 386 | 386 | mt/d |
| Methanol Product Output Carbon Flow | 119.2 | 250.0 | 305.1 | 172.9 | mt/d |
| % of sustainable atomic carbon input directed into sequestration | 53% | 45% | 43% | 49% | |
| Product atomic carbon yield per sustainable atomic carbon input into process | 0.31 | 0.65 | 0.79 | 0.45 | |
| Product yield per dry solid sustainable carbon material input into process | 0.41 | 0.86 | 1.06 | 0.60 | |
| Total flow of CO2 into sequestration | 752 | 920 | 992 | 821 | mt/d |
| Portion of CO2 flow into sequestration from fossil sources | 0% | 31% | 38% | 16% | |
| GREET Based GHG LCA (CO2e) | | | | | |
| | -665 | -4 | 276 | -395 | mt/d |
| GREET Style Net GHG LCA | -2.09 | -0.01 | 0.34 | -0.86 | mt CO2 / mt Methanol |
| | -122% | 0% | 20% | -50% | % of Fossil Baseline |

Fig. 3

| Hydrocarbons | CASE 4A<br>Hydrocarbons<br>100<br>Prior Art | CASE 4B<br>Hydrocarbons<br>200A<br>Net Zero GHG LCA | CASE 4C<br>Hydrocarbons<br>200A<br>20% of fossil GHG LCA | CASE 4D<br>Hydrocarbons<br>200A<br>-50% of fossil GHG LCA | |
|---|---|---|---|---|---|
| FLOW CALCULATIONS | | | | | |
| BLOCK 104 and 204 | | | | | |
| NG Input to converter | 0 | 268 | 376 | 117 | mt/d |
| Gasification stage effluent - CO | 505 | 857 | 998 | 659 | mt/d |
| Gasification stage effluent - CO2 | 595 | 780 | 853 | 676 | mt/d |
| Gasification stage effluent - H2 | 27 | 77 | 97 | 49 | mt/d |
| BLOCK 112, 212, 212B, and 212C | | | | | |
| Portion of gasification stage effluent routed to CO converter | 45% | 29% | 26% | 36% | |
| Portion of converted stream routed to CO2 removal | 100% | 100% | 100% | 100% | |
| CO2 recycled to gasification stage from CO2 removal unit | 135 | 135 | 135 | 135 | mt/d |
| CO2 directed into sequestration from CO2 removal unit | 772 | 980 | 1063 | 863 | mt/d |
| CO2 leakage from CO2 removal unit | 48 | 59 | 63 | 53 | mt/d |
| Hydrocarbons plant (i.e. conversion stage) Input - CO | 276 | 606 | 738 | 420 | mt/d |
| Hydrocarbons plant (i.e. conversion stage) Input - CO2 | 0 | 0 | 0 | 0 | mt/d |
| Hydrocarbons plant (i.e. conversion stage) Input - H2 | 43 | 95 | 116 | 66 | mt/d |
| BLOCK 126 or 226 | | | | | |
| Hydrocarbons Product Output | 134 | 293 | 357 | 203 | mt/d |
| EMBODIMENT METRICS | | | | | |
| Hydrocarbons Product Output relative to conventional case | 100% | 219% | 267% | 152% | |
| Portion of Fossil Carbon in Hydrocarbons Product Output | 0% | 41% | 49% | 23% | |
| Volumetric Flow Rate in gasification stage effluent relative to conventional case | 100% | 193% | 230% | 141% | |
| % of net atomic carbon input into process from fossil sources | 0% | 34% | 42% | 19% | |
| Sustainable atomic carbon input into process | 386 | 386 | 386 | 386 | mt/d |
| Hydrocarbons Product Output Carbon Flow | 114 | 249 | 304 | 173 | mt/d |
| % of sustainable atomic carbon input directed into sequestration | 55% | 47% | 45% | 50% | |
| Product atomic carbon yield per sustainable atomic carbon input into process | 0.29 | 0.65 | 0.79 | 0.45 | |
| Product yield per dry solid sustainable carbon material input into process | 0.17 | 0.38 | 0.46 | 0.26 | |
| Total flow of CO2 into sequestration | 772 | 980 | 1063 | 863 | mt/d |
| Portion of CO2 flow into sequestration from fossil sources | 0% | 33% | 40% | 18% | |
| GREET Based GHG LCA (CO2e) | | | | | |
| | -691 | -2 | 277 | -391 | mt/d |
| GREET Style Net GHG LCA | -5.2 | 0.0 | 0.8 | -1.9 | mt CO2 / mt Hydrocarbons |
| | -134% | 0% | 20% | -50% | % of Fossil Baseline |

Fig. 4

| Ammonia | CASE 5A Ammonia 100 Prior Art | CASE 5B Ammonia 200A Net Zero GHG LCA | CASE 5C Ammonia 200A 10% of fossil GHG LCA | CASE 5D Ammonia 200A -50% of fossil GHG LCA | |
|---|---|---|---|---|---|
| FLOW CALCULATIONS | | | | | |
| BLOCK 104 and 204 | | | | | |
| NG Input to converter | 0 | 1400 | 2600 | 315 | mt/d |
| | | | | | |
| Gasification stage effluent - CO | 505 | 2343 | 3918 | 919 | mt/d |
| Gasification stage effluent - CO2 | 595 | 1558 | 2383 | 812 | mt/d |
| Gasification stage effluent - H2 | 27 | 290 | 515 | 86 | mt/d |
| BLOCK 112, 212, 212B, and 212C | | | | | |
| Portion of gasification stage effluent routed to CO converter | 100% | 100% | 100% | 100% | |
| Portion of converted stream routed to CO2 removal | 100% | 100% | 100% | 100% | |
| | | | | | |
| CO2 recycled to gasification stage from CO2 removal unit | 135 | 135 | 135 | 135 | mt/d |
| CO2 directed into sequestration from CO2 removal unit | 1185 | 4842 | 7977 | 2007 | mt/d |
| CO2 leakage from CO2 removal unit | 69 | 262 | 427 | 113 | mt/d |
| | | | | | |
| Ammonia plant (i.e. conversion stage) Input - H2 | 51 | 366 | 636 | 121 | mt/d |
| BLOCK 126 or 226 | | | | | |
| Ammonia Product Output | 275 | 1988 | 3457 | 660 | mt/d |
| | | | | | |
| EMBODIMENT METRICS | | | | | |
| Ammonia Product Output relative to conventional case | 100% | 724% | 1258% | 240% | |
| Volumetric Flow Rate in gasification stage effluent relative to conventional case | 100% | 585% | 1001% | 209% | |
| % of net atomic carbon input into process from fossil sources | 0% | 73% | 83% | 38% | |
| Sustainable atomic carbon input into process | 386 | 386 | 386 | 386 | mt/d |
| Ammonia Product Output Carbon Flow | 0.0 | 0.0 | 0.0 | 0.0 | mt/d |
| % of sustainable atomic carbon input directed into sequestration | 84% | 84% | 84% | 84% | |
| Product atomic carbon yield per sustainable atomic carbon input into process | 0.00 | 0.00 | 0.00 | 0.00 | |
| Product yield per dry solid sustainable carbon material input into process | 0.36 | 2.58 | 4.48 | 0.86 | |
| Total flow of CO2 into sequestration | 1185 | 4842 | 7977 | 2007 | mt/d |
| Portion of CO2 flow into sequestration from fossil sources | 0% | 75% | 85% | 41% | |
| | | | | | |
| GREET Based GHG LCA (CO2e) | | | | | |
| | -1098 | -12 | 922 | -856 | mt/d |
| GREET Style Net GHG LCA | -3.99 | -0.01 | 0.27 | -1.30 | mt CO2 / mt Ammonia |
| | -154% | 0% | 10% | -50% | % of Fossil Baseline |

Fig. 5

| Methanol | CASE 3A Methanol 100 Prior Art | CASE 8B Methanol 200B Net Zero GHG LCA | CASE 8C Methanol 200B 20% of fossil GHG LCA | CASE 8D Methanol 200B Max Bio-Fuel Output | |
|---|---|---|---|---|---|
| FLOW CALCULATIONS | | | | | |
| BLOCK 250 | | | | | |
| NG Input to second converter | | 0 | 350 | 390 | mt/d |
| CO2 directed into sequestration from second CO2 removal unit | | 246 | | | |
| CO2 Leakage from second CO2 removal unit | | 643 | 914 | 1019 | mt/d |
| H2 from hydrocarbon processing stage | | 34 | 48 | 54 | mt/d |
| | | 69 | 98 | 110 | mt/d |
| BLOCK 104 and 204 | | | | | |
| NG Input to converter | | 0 | 0 | 0 | mt/d |
| Gasification stage effluent - CO | 505 | 505 | 505 | 505 | mt/d |
| Gasification stage effluent - CO2 | 595 | 595 | 595 | 595 | mt/d |
| Gasification stage effluent - H2 | 27 | 27 | 27 | 27 | mt/d |
| BLOCK 112, 212, 212B, and 212C | | | | | |
| Portion of gasification stage effluent routed to CO converter | 43% | 0% | 0% | 0% | |
| Portion of converted stream routed to CO2 removal | 100% | 73% | 38% | 24% | |
| CO2 recycled to gasification stage from CO2 removal unit | 135 | 135 | 135 | 135 | mt/d |
| CO2 directed into sequestration from CO2 removal unit | 752 | 278 | 77 | 0 | mt/d |
| CO2 leakage from CO2 removal unit | 47 | 22 | 11 | 7 | mt/d |
| Methanol plant (i.e. conversion stage) Input - CO | 290 | 505 | 505 | 505 | mt/d |
| Methanol plant (i.e. conversion stage) Input - CO2 | 0 | 161 | 372 | 453 | mt/d |
| Methanol plant (i.e. conversion stage) Input - H2 | 42 | 96 | 125 | 137 | mt/d |
| BLOCK 126 or 226 | | | | | |
| Methanol Product Output | 318 | 666 | 814 | 870 | mt/d |
| EMBODIMENT METRICS | | | | | |
| Methanol Product Output relative to conventional case | 100% | 210% | 256% | 274% | |
| Portion of Fossil Carbon in Methanol Product Output | 0% | 0% | 0% | 0% | |
| Volumetric Flow Rate in gasification stage effluent relative to conventional case | 100% | 100% | 100% | 100% | |
| % of net atomic carbon input into process from fossil sources | 0% | 32% | 41% | 43% | |
| Sustainable atomic carbon input into process | 386 | 386 | 386 | 386 | mt/d |
| Methanol Product Output Carbon Flow | 119.2 | 249.9 | 305.2 | 326.4 | mt/d |
| % of sustainable atomic carbon input directed into sequestration | 53% | 20% | 5% | 0% | |
| Product atomic carbon yield per sustainable atomic carbon input into process | 0.31 | 0.65 | 0.79 | 0.85 | |
| Product yield per dry solid sustainable carbon material input into process | 0.41 | 0.86 | 1.06 | 1.13 | |
| Total flow of CO2 into sequestration | 752 | 920 | 991 | 1019 | mt/d |
| Portion of CO2 flow into sequestration from fossil sources | 0% | 70% | 92% | 100% | |
| GREET Based GHG LCA (CO2e) | | | | | |
| | -665 | 0 | 282 | 390 | mt/d |
| GREET Style Net GHG LCA | -2.09 | 0.00 | 0.35 | 0.45 | mt CO2 / mt Methanol |
| | -122% | 0% | 20% | 26% | % of Fossil Baseline |

Fig. 8

| Hydrocarbons | CASE 4A<br>Hydrocarbons<br>100<br>Prior Art | CASE 9B<br>Hydrocarbons<br>200B<br>Net Zero GHG LCA | CASE 9C<br>Hydrocarbons<br>200B<br>20% of fossil GHG LCA | CASE 9D<br>Hydrocarbons<br>200B<br>Max Bio-Fuel Output | |
|---|---|---|---|---|---|
| FLOW CALCULATIONS | | | | | |
| BLOCK 250 | | | | | |
| NG Input to second converter | | 0 | 375 | 420 | mt/d |
| CO2 directed into sequestration from second CO2 removal unit | | 0 | 266 | 1098 | mt/d |
| CO2 leakage from second CO2 removal unit | | 0 | 695 | 979 | mt/d |
| H2 from hydrocarbon processing stage | | 0 | 37 | 52 | mt/d |
| | | 0 | 75 | 105 | mt/d |
| BLOCK 104 and 204 | | | | | |
| NG Input to converter | | 0 | 0 | 0 | mt/d |
| Gasification stage effluent - CO | 505 | 505 | 505 | 505 | mt/d |
| Gasification stage effluent - CO2 | 595 | 595 | 595 | 595 | mt/d |
| Gasification stage effluent - H2 | 27 | 27 | 27 | 27 | mt/d |
| BLOCK 112, 212, 212B, and 212C | | | | | |
| Portion of gasification stage effluent routed to CO converter | 45% | 0% | 0% | 0% | |
| Portion of converted stream routed to CO2 removal | 100% | 74% | 39% | 24% | |
| CO2 recycled to gasification stage from CO2 removal unit | 135 | 135 | 135 | 135 | mt/d |
| CO2 directed into sequestration from CO2 removal unit | 772 | 283 | 84 | 0 | mt/d |
| CO2 leakage from CO2 removal unit | 48 | 22 | 12 | 7 | mt/d |
| Hydrocarbons plant (i.e. conversion stage) Input - CO | 276 | 505 | 505 | 505 | mt/d |
| Hydrocarbons plant (i.e. conversion stage) Input - CO2 | 0 | 155 | 365 | 453 | mt/d |
| Hydrocarbons plant (i.e. conversion stage) Input - H2 | 43 | 102 | 132 | 145 | mt/d |
| BLOCK 126 or 226 | | | | | |
| Hydrocarbons Product Output | 134 | 292 | 357 | 384 | mt/d |
| EMBODIMENT METRICS | | | | | |
| Hydrocarbons Product Output relative to conventional case | 100% | 218% | 267% | 287% | |
| Portion of Fossil Carbon in Hydrocarbons Product Output | 0% | 0% | 0% | 0% | |
| Volumetric Flow Rate in gasification stage effluent relative to conventional case | 100% | 100% | 100% | 100% | |
| % of net atomic carbon input into process from fossil sources | 0% | 34% | 42% | 45% | |
| Sustainable atomic carbon input into process | 386 | 386 | 386 | 386 | mt/d |
| Hydrocarbons Product Output Carbon Flow | 113.7 | 248.3 | 303.3 | 326.4 | mt/d |
| % of sustainable atomic carbon input directed into sequestration | 55% | 20% | 6% | 0% | mt/d |
| Product atomic carbon yield per sustainable atomic carbon input into process | 0.29 | 0.64 | 0.79 | 0.85 | |
| Product yield per dry solid sustainable carbon material input into process | 0.17 | 0.38 | 0.46 | 0.50 | |
| Total flow of CO2 into sequestration | 772 | 978 | 1063 | 1098 | mt/d |
| Portion of CO2 flow into sequestration from fossil sources | 0% | 71% | 92% | 100% | |
| GREET Based GHG LCA (CO2e) | | | | | |
| GREET Style Net GHG LCA | -691 | -2 | 280 | 398 | mt/d |
| | -5.16 | -0.01 | 0.78 | 1.04 | mt CO2 / mt Hydrocarbons |
| | -134% | 0% | 20% | 27% | % of Fossil Baseline |

Fig. 9

| Ammonia | CASE 5A Ammonia 100 Prior Art | CASE 10B Ammonia 200B Net Zero GHG LCA | CASE 10C Ammonia 200B 10% of fossil GHG LCA | |
|---|---|---|---|---|
| FLOW CALCULATIONS | | | | |
| BLOCK 250 | | | | |
| NG Input to second converter | 0 | 1400 | 2600 | mt/d |
| CO2 directed into sequestration from second CO2 removal unit | 0 | 3658 | 6793 | mt/d |
| CO2 Leakage from second CO2 removal unit | 0 | 193 | 358 | mt/d |
| H2 from hydrocarbon processing stage | 0 | 394 | 731 | mt/d |
| BLOCK 104 and 204 | | | | |
| NG Input to converter | 0 | 0 | 0 | mt/d |
| Gasification stage effluent - CO | 505 | 505 | 505 | mt/d |
| Gasification stage effluent - CO2 | 595 | 595 | 595 | mt/d |
| Gasification stage effluent - H2 | 27 | 27 | 27 | mt/d |
| BLOCK 112, 212, 212B, and 212C | | | | |
| Portion of gasification stage effluent routed to CO converter | 100% | 100% | 100% | |
| Portion of converted stream routed to CO2 removal | 100% | 100% | 100% | |
| CO2 recycled to gasification stage from CO2 removal unit | 135 | 135 | 135 | mt/d |
| CO2 directed into sequestration from CO2 removal unit | 1185 | 1185 | 1185 | mt/d |
| CO2 leakage from CO2 removal unit | 69 | 69 | 69 | mt/d |
| Ammonia plant (i.e. conversion unit 126 or 226) Input Stream 124 or 224 - H2 | 51 | 366 | 636 | mt/d |
| BLOCK 126 or 226 | | | | |
| Ammonia Product Output | 275 | 1988 | 3457 | mt/d |
| EMBODIMENT METRICS | | | | |
| Ammonia Product Output relative to conventional case | 100% | 724% | 1258% | |
| Volumetric Flow Rate in gasification stage effluent relative to conventional case | 100% | 100% | 100% | |
| % of net atomic carbon input into process from fossil sources | 0% | 73% | 83% | |
| Sustainable atomic carbon input into process | 386 | 386 | 386 | mt/d |
| Ammonia Product Output Carbon Flow | 0.0 | 0.0 | 0.0 | mt/d |
| % of sustainable atomic carbon input directed into sequestration | 84% | 84% | 84% | mt/d |
| Product atomic carbon yield per sustainable atomic carbon input into process | 0.00 | 0.00 | 0.00 | |
| Product yield per dry solid sustainable carbon material input into process | 0.36 | 2.58 | 4.48 | |
| Total flow of CO2 into sequestration | 1185 | 4842 | 7977 | mt/d |
| Portion of CO2 flow into sequestration from fossil sources | 0% | 76% | 85% | |
| GREET Based GHG LCA (CO2e) | | | | |
| GREET Style Net GHG LCA | -1098 | -9 | 923 | mt/d |
|  | -3.99 | 0.00 | 0.27 | mt CO2 / mt Ammonia |
|  | -154% | 0% | 10% | % of Fossil Baseline |

Fig. 10

| Methanol | | CASE 11B<br>Methanol<br>200C<br>Net Zero GHG LCA | CASE 11C<br>Methanol<br>200C<br>20% of fossil GHG LCA | CASE 11D<br>Methanol<br>200C<br>Max Bio-Fuel Output | |
|---|---|---|---|---|---|
| FLOW CALCULATIONS | | | | | |
| BLOCK 250 | | | | | |
| NG Input to second converter | | 297 | 410 | 460 | mt/d |
| CO2 directed into sequestration from second CO2 removal unit | | 775 | 1072 | 1202 | mt/d |
| CO2 Leakage from second CO2 removal unit | | 41 | 56 | 63 | mt/d |
| H2 from hydrocarbon processing stage | | 83 | 115 | 129 | mt/d |
| BLOCK 104 and 204 | | | | | |
| NG input to converter | | 0 | 0 | 0 | mt/d |
| Gasification stage effluent - CO | | 505 | 505 | 505 | mt/d |
| Gasification stage effluent - CO2 | | 595 | 595 | 595 | mt/d |
| Gasification stage effluent - H2 | | 27 | 27 | 27 | mt/d |
| BLOCK 112, 212, 212B, and 212C | | | | | |
| Portion of gasification stage effluent routed to CO converter | | 0% | 0% | 0% | |
| Portion of converted stream routed to CO2 removal | | 56% | 17% | 0% | |
| CO2 recycled to gasification stage from CO2 removal unit | | 0 | 0 | 0 | mt/d |
| CO2 directed into sequestration from CO2 removal unit | | 315 | 96 | 0 | mt/d |
| CO2 leakage from CO2 removal unit | | 17 | 5 | 0 | mt/d |
| Methanol plant (i.e. conversion stage) Input - CO | | 505 | 505 | 505 | mt/d |
| Methanol plant (i.e. conversion stage) Input - CO2 | | 264 | 494 | 595 | mt/d |
| Methanol plant (i.e. conversion stage) Input - H2 | | 111 | 142 | 156 | mt/d |
| BLOCK 126 or 226 | | | | | |
| Methanol Product Output | | 738 | 899 | 970 | mt/d |
| EMBODIMENT METRICS | | | | | |
| Methanol Product Output relative to conventional case | | 232% | 283% | 305% | |
| Portion of Fossil Carbon in Methanol Product Output | | 0% | 0% | 0% | |
| Volumetric Flow Rate in gasification stage effluent relative to conventional case | | 100% | 100% | 100% | |
| % of net atomic carbon input into process from fossil sources | | 37% | 44% | 47% | |
| Sustainable atomic carbon input into process | | 386 | 386 | 386 | mt/d |
| Methanol Product Output Carbon Flow | | 276.8 | 337.2 | 363.7 | mt/d |
| % of sustainable atomic carbon input directed into sequestration | | 22% | 7% | 0% | mt/d |
| Product atomic carbon yield per sustainable atomic carbon input into process | | 0.72 | 0.87 | 0.94 | |
| Product yield per dry solid sustainable carbon material input into process | | 0.96 | 1.17 | 1.26 | |
| Total flow of CO2 into sequestration | | 1090 | 1168 | 1202 | mt/d |
| Portion of CO2 flow into sequestration from fossil sources | | 71% | 92% | 100% | |
| GREET Based GHG LCA (CO2e) | | | | | |
| GREET Style Net GHG LCA | | 2 | 309 | 444 | mt/d |
| | | 0.00 | 0.34 | 0.46 | mt CO2 / mt Methanol |
| | | 0% | 20% | 27% | % of Fossil Baseline |

Fig. 11

| Hydrocarbons | CASE 12B Hydrocarbons 200C Net Zero GHG LCA | CASE 12C Hydrocarbons 200C 20% of fossil GHG LCA | CASE 12D Hydrocarbons 200C Max Bio-Fuel Output | |
|---|---|---|---|---|
| FLOW CALCULATIONS | | | | |
| BLOCK 250 | | | | |
| NG Input to second converter | 320 | 436 | 494 | mt/d |
| CO2 directed into sequestration from second CO2 removal unit | 835 | 1138 | 1291 | mt/d |
| CO2 leakage from second CO2 removal unit | 44 | 60 | 68 | mt/d |
| H2 from hydrocarbon processing stage | 90 | 122 | 139 | mt/d |
| BLOCK 104 and 204 | | | | |
| NG Input to converter | 0 | 0 | 0 | mt/d |
| Gasification stage effluent - CO | 505 | 505 | 505 | mt/d |
| Gasification stage effluent - CO2 | 595 | 595 | 595 | mt/d |
| Gasification stage effluent - H2 | 27 | 27 | 27 | mt/d |
| BLOCK 112, 212, 212B, and 212C | | | | |
| Portion of gasification stage effluent routed to CO converter | 0% | 0% | 0% | |
| Portion of converted stream routed to CO2 removal | 57% | 19% | 0% | |
| CO2 recycled to gasification stage from CO2 removal unit | 0 | 0 | 0 | mt/d |
| CO2 directed into sequestration from CO2 removal unit | 320 | 107 | 0 | mt/d |
| CO2 leakage from CO2 removal unit | 17 | 6 | 0 | mt/d |
| Hydrocarbons plant (i.e. conversion stage) Input - CO | 505 | 505 | 505 | mt/d |
| Hydrocarbons plant (i.e. conversion stage) Input - CO2 | 258 | 482 | 595 | mt/d |
| Hydrocarbons plant (i.e. conversion stage) Input - H2 | 117 | 150 | 166 | mt/d |
| BLOCK 126 or 226 | | | | |
| Hydrocarbons Product Output | 324 | 393 | 428 | mt/d |
| EMBODIMENT METRICS | | | | |
| Hydrocarbons Product Output relative to conventional case | 242% | 294% | 320% | |
| Portion of Fossil Carbon in Hydrocarbons Product Output | 0% | 0% | 0% | |
| Volumetric Flow Rate in gasification stage effluent relative to conventional case | 100% | 100% | 100% | |
| % of net atomic carbon input into process from fossil sources | 38% | 46% | 49% | |
| Sustainable atomic carbon input into process | 386 | 386 | 386 | mt/d |
| Hydrocarbons Product Output Carbon Flow | 275.4 | 334.0 | 363.7 | mt/d |
| % of sustainable atomic carbon input directed into sequestration | 23% | 8% | 0% | |
| Product atomic carbon yield per sustainable atomic carbon input into process | 0.71 | 0.87 | 0.94 | |
| Product yield per dry solid sustainable carbon material input into process | 0.42 | 0.51 | 0.55 | |
| Total flow of CO2 into sequestration | 1155 | 1245 | 1291 | mt/d |
| Portion of CO2 flow into sequestration from fossil sources | 72% | 91% | 100% | |
| GREET Based GHG LCA (CO2e) | | | | |
| GREET Style Net GHG LCA | 2 | 302 | 453 | mt/d |
| | 0.01 | 0.77 | 1.06 | mt CO2 / mt Hydrocarbons |
| | 0% | 20% | 28% | % of Fossil Baseline |

Fig. 12

ENHANCED GASIFICATION SYSTEM AND METHOD

CROSS-REFERENCE TO RELATED APPLICATIONS

This patent application claims benefit of U.S. Provisional Patent Application Ser. No. 63/381,065 filed Oct. 26, 2022, which is entirely incorporated herein by reference.

BACKGROUND

A variety of processes exist to convert solid biogenic carbon materials and solid non-biogenic carbon wastes into useful chemical products such as hydrocarbon fuels (such as gasoline, jet, and diesel fuel), lubricants, ethanol, methanol, ammonia, plastics, plastic precursors, and other products. Solid biogenic carbon materials, here, refers to biologically grown materials, such as wood, grass, leaves, seaweed, animal waste, food scraps, algae, the biogenic portion of municipal solid waste and the like (collectively, "biomass"). Such biomass may be purpose grown, such as corn for use in the production of bio-ethanol via fermentation, or it may be a waste byproduct of other activities, such as sawdust from a sawmill. Solid non-biogenic wastes, here, refers to non-biogenic municipal solid waste, including plastics, and other non-biogenic solid wastes resulting from industrial or consumer activities. Herein "solid sustainable carbon materials" shall be used to refer collectively to solid biogenic carbon materials and solid non-biogenic carbon materials, reflecting the potential to make chemical products with a reduced environmental burden when utilizing such "solid sustainable carbon materials" instead of conventional fossil carbon materials such as coal, natural gas, petroleum, and the like. One emerging process to convert solid sustainable carbon materials into useful chemical products is gasification, which converts such materials into synthesis gas ("syngas"), a mixture of hydrogen gas ($H_2$) and carbon monoxide (CO), which can then be used to make many useful products via known chemical conversion processes.

FIG. 1 is a process diagram of a conventional solid sustainable carbon gasification to chemicals conversion process 100. Solid sustainable carbon material is first sized and dried, e.g. into chips or pellets with between 20% and 5% moisture by weight. The sized and dried solid sustainable carbon material is then conveyed as feed 102 into a gasifier 106 within gasification stage 104, including gasifier 106 and tar converter 110. In many gasification processes, oxygen 108 and steam 109 are provided to the gasification stage, including to gasifier 106 and often also tar converter 110. The oxygen raw material 108 may be provided by an air separation unit (not shown) or a water electrolysis system (not shown). The steam raw material 109 may be provided by downstream processing units that generate excess steam via a steam recycle loop (not shown) or from dedicated steam generation units (not shown). The sized and dried solid sustainable carbon material feed 102 conveyed into gasifier 106 is therein heated, usually in the presence of oxygen and steam, and usually at elevated pressure, to make CO and $H_2$ according to known "gasification" processes. The gasification process is typically performed at conditions of temperature, pressure, oxygen partial pressure, and steam partial pressure to optimize yield of CO and $H_2$. By-product carbon dioxide ($CO_2$), water ($H_2O$), and tar are generally also obtained. Herein "tar" includes, for example, medium and heavy organic hydrocarbons and other non-hydrocarbon organic compounds. The gasification stage 104 often has a tar converter 110 that processes the tar, also according to known processes, to obtain additional CO and $H_2$, along with additional by-product $CO_2$.

One well known process for tar conversion is "partial oxidation" ("POX"), in which the tars are subjected to high temperatures in the presence of oxygen and steam (which may be supplied at 108 and 109, if sufficient oxygen and steam are not already in the process) to convert such tars into additional syngas, along with additional byproduct $CO_2$ and water. Such tar conversion processes usually also convert any light hydrocarbons, such as methane ($CH_4$), that may be present in the gasifier, such that the resulting effluent of the gasification stage 104 consists of substantially all syngas, $CO_2$, and water. In some gasification systems other tar conversion processes, such as catalytic conversion, are used instead of POX. Such other tar conversion processes may yield an output stream that is substantially free of tars but which contains methane and other light hydrocarbons. Gases produced by the gasifier 106 can be routed to the tar converter 110, or some or all can be separated and routed to bypass the tar converter 110.

For many downstream processes, the syngas preferably has a volumetric ratio of $H_2$ to CO of between 2 and 2.5, as, for example, in the production of methanol or Fischer-Tropsch ("FT") hydrocarbons from syngas. In some cases a downstream process may convert syngas as well as $CO_2$ into useful chemicals, and in some such instances additional $H_2$ may be used to convert such $CO_2$; for example, whereas an $H_2$:CO ratio of 2 to 2.5 may be suitable for methanol or FT hydrocarbon production from syngas, an additional $H_2$ molecule is required to convert $CO_2$ such that a $H_2$:$CO_2$ ratio of 3 to 3.5 may be suitable for methanol or FT hydrocarbon production from $H_2$ and $CO_2$. In some cases, such as in the production of ammonia, the downstream process requires not syngas but rather pure $H_2$. A representative gasification stage 104 described above, with tar processing, may produce an effluent 111 with $H_2$:CO:$CO_2$ relative composition (by volume) of 0.3:0.4:0.3.

To achieve a process suitable for the downstream processes that produce useful chemicals, the output of the gasification stage 104 is routed to a refining stage 112. The refining stage 112 typically includes at least a $CO_2$ removal unit 114 to separate, or "capture", $CO_2$ from the process. The typical $CO_2$ removal unit is an "acid gas removal" ("AGR") unit that separates $CO_2$, sulfur compounds, such as $H_2S$, and other "acid gases" from a gas stream using any suitable process, such as cryogenic distillation. Such processes are known. The refining stage 112 may also have an additional further downstream purification unit 117 to remove any residual impurities. For example, purification unit 117 may include a sulfur removal unit, such as a fixed bed catalytic, chemisorption, or physisorption purification unit, to remove sulfur species from the process. A precursor 132, which is a mixture of a $CO_2$ free, or $CO_2$ depleted, effluent of the $CO_2$ removal unit 114 may be routed to the purification unit 117, if desired, or the purification unit can be omitted if further purification is not needed. Where the purification unit 117 is used, the purification unit 117 yields a refining stage effluent 120. Where the purification unit 117 is omitted, the precursor 132 becomes the refining stage effluent 120 directly.

Methanol and FT synthesis catalysts are known to be highly sensitive to sulfur impurities, and as a result many methanol or FT hydrocarbon production plants include catalytic, chemisorption, and/or physisorption sulfur removal units to achieve sufficiently low impurity levels. Purification unit 117 may include a pressure swing absorber (PSA) suitable for producing high purity $H_2$ streams, useful for ammonia production (or for producing high purity $H_2$ itself as an end product); in such cases the precursor 132 that follows the $CO_2$ removal unit would contain substantially all $H_2$, and the PSA would serve to further increase the purity of such $H_2$ by removing, for example, residual CO, $CO_2$, and $CH_4$.

Commonly, solid sustainable carbon material gasification plants increase the amount of $H_2$ in the output of the refining stage 112 by reacting the CO in the refining stage with $H_2O$ in a CO converter 113 to yield $CO_2$ and $H_2$ using the well-known "water-gas shift" reaction ("WGS"), thus lowering the concentration of CO and raising the concentration of $H_2$ to yield a stream with a more suitable composition for downstream processing. Such CO converter 113 is provided upstream of $CO_2$ removal unit 114, so that $CO_2$ produced by the CO converter 113 may be removed by the $CO_2$ removal unit 114 if desired. The CO converter 113 converts at least a portion of the gasification stage effluent 111 to produce a converted stream 130, which can be the product of converting the entire gasification stage effluent 111 or only a portion thereof. At least a portion of the converted stream 130 is routed to the $CO_2$ removal unit 114. For example, a WGS unit and an AGR unit can be used in combination, each configured with controllable bypass lines, so that by controlling the flows through each unit and its bypass a final refining stage effluent 120 has a ratio of $H_2$, CO, and $CO_2$ (potentially including substantially zero $CO_2$) suitable for downstream processing.

It is known that $CO_2$ captured and removed from a process as described above can be permanently sequestered, for example in subterranean geologic formations. Permanently sequestering $CO_2$ in this manner can reduce the environmental burden of an industrial activity like chemical production. This concept is referred to broadly as carbon "capture and sequestration" (CCS). Thus the $CO_2$ from a solid sustainable carbon material gasification process could be captured in the $CO_2$ removal unit and directed to a $CO_2$ by-product 116, which can be sequestered underground after suitable purification and compression to a suitable pressure. In some cases, a portion 118 of the captured $CO_2$ may be recycled back to the gasification stage 104 (instead of being directed to $CO_2$ by-product 116 for sequestration), for use inside such gasification block (e.g. in cases where gasification block 104 requires $CO_2$ input).

The refining stage 112 yields a refining stage effluent 120 that is suitable for use as a feedstock for a downstream chemical production process, e.g. the FT hydrocarbon process, methanol process, or ammonia process. It is possible to have a monitoring system 122 that monitors the flow rates of the different species in the refining stage effluent 120, including separating the streams to enable such monitoring if needed, and then recombining them into a conversion feed 124. If such monitoring system 122 is not present, or if such monitoring system is lossless, then the refining stage effluent 120 becomes the conversion feed 124 directly, and the composition and mass flow rates of the refining stage effluent 120 and the conversion feed 124 are the same. The conversion feed 124 is routed to a conversion stage 126, which makes chemical products such as methanol, hydrocarbons, or ammonia from the conversion feed 124. In some cases, the conversion stage 126 makes a fuel gas by-product 129 that can be used in up-stream processes as an energy source, such as in gasification stage 104. For example, excess hydrocarbons and syngas from an FT hydrocarbon plant may be recycled and supplied to gasification stage 104 as an energy source. In some cases, conversion stage 126 may produce one or more additional by-product materials, such as steam, that can be useful in upstream processes, such as in gasification stage 104. For example, excess steam from a methanol or FT hydrocarbon plant may be recycled to gasification stage 104. Where the conversion stage produces an ammonia product, a nitrogen feed 142 is further provided to the conversion stage 126.

There is increasing interest in converting waste solid sustainable carbon materials, as opposed to purpose grown (or produced) solid sustainable carbon materials, into useful chemicals as a pathway to produce chemicals with a very low (or even zero) environmental burden associated with their production and use. This burden is commonly metricized through a "greenhouse gas life-cycle assessment" ("GHG LCA") that computes the total amount of GHGs emitted into the environment over the entire lifecycle of a product. Whereas purpose grown solid sustainable carbon materials incur significant GHG LCA contributions through their initial production (e.g. for biomass, through cultivation/growth and harvesting), waste solid sustainable carbon materials contribute GHGs to a product lifecycle only starting from their collection. The GHG LCA contribution from cultivation, growth, and harvesting of purpose grown (or produced) solid sustainable carbon material is normally much larger than the GHG LCA contribution from solid sustainable carbon waste material collection, so products made from waste solid sustainable carbon material often have much lower GHG LCA values.

A key challenge in converting waste solid sustainable carbon material into low (or even zero) GHG LCA chemicals is the traditionally low production efficiency of chemical output compared with solid sustainable carbon material input, along with the very high plant capital cost. For example, in a typical biomass gasification to methanol process, less than ⅓ of the input carbon goes to produce methanol, while the remaining input carbon is "wasted" in byproducts like $CO_2$ emissions. On a carbon basis, this means that the process is only producing about ⅓ of the theoretical maximum product yield. Due to the inherently distributed nature of waste solid sustainable carbon material generation, and the relatively high cost of waste solid sustainable carbon material transport, it is found that the most economical production facilities utilize waste solid sustainable carbon material that is generated in the immediate vicinity (e.g. within a 50 mile radius), which practically limits the facility capacity. When considering the feasibility of building many such facilities around the world, a facility of average size could economically operate using about 900 metric tonnes (mt) per day of waste solid sustainable carbon material (measured for a typical as-fed moisture level of 15%). Larger facilities are possible in certain locations where waste solid sustainable carbon material generation is unusually concentrated, but relatively few such facilities can be feasibly built and economically operated. Given such limitations, a low production efficiency process (i.e. a process that produces less product for the same amount of waste solid sustainable carbon material input) creates three negative consequences relative to a high production efficiency process: (1) more waste solid sustainable carbon material is required for the same amount of output product, increasing operating costs; (2) the same size gasification plant produces less product, increasing capital costs (relative to plant productivity); and (3) the plant converting the gasification output into the final product is limited to a smaller scale, increasing capital costs (relative to plant productivity) due to poorer economies of scale. The increases in capital costs highlighted here are a particularly important negative consequence as high capital cost is one of the major barriers to economical production of chemicals from waste solid sustainable carbon material.

Ways to increase the production efficiency (in terms of product output compared with waste solid sustainable carbon material input) of facilities that convert waste solid sustainable carbon material into low GHG LCA chemicals via gasification are thus needed.

SUMMARY

Embodiments described herein provide a process for making chemical products from waste solid sustainable carbon materials, the process comprising providing waste solid sustainable carbon material to a gasifier; gasifying the waste solid sustainable carbon material to produce a first stream comprising CO, $H_2$, $CO_2$, and a mixture of organic compounds; providing a second stream comprising hydrocarbon derived from a fossil source (herein referred to as fossil-derived hydrocarbons); converting the organic compounds in the first stream and the hydrocarbon in the second stream into CO, $H_2$, and $CO_2$, to form one or more gas streams comprising CO, $H_2$, and $CO_2$; converting at least a portion of CO in the one or more gas streams to $CO_2$ to increase $H_2$ in the one or more gas streams and to form one or more converted streams; separating $CO_2$ from the one or more converted streams to form a conversion feed from the one or more converted streams; sequestering at least a portion of the separated $CO_2$ in a sequestration facility; and producing one or more chemical products from the conversion feed.

Other embodiments described herein provide an apparatus for making organic chemical products, the apparatus comprising a waste solid sustainable carbon material gasification stage comprising a gasifier to form CO, $H_2$, $CO_2$, and organic molecules from the waste solid sustainable carbon material, and a converter to convert tars and fossil-derived hydrocarbons to CO, $H_2$, and $CO_2$; a source of fossil-derived hydrocarbon coupled to the converter; a CO converter to convert CO to $H_2$ and $CO_2$; a $CO_2$ removal unit to remove $CO_2$ and form a conversion feed; a conduit to route removed $CO_2$ to a sequestration facility; and a conversion stage to produce a chemical product from the conversion feed.

Other embodiments described herein provide an apparatus for making chemical products, the apparatus comprising a waste solid sustainable carbon material gasification stage comprising a gasifier to form CO, $H_2$, $CO_2$, and organic molecules from the waste solid sustainable carbon material, and a converter to convert tars to CO, $H_2$, and $CO_2$; a hydrocarbon processing stage to form CO, $H_2$, and $CO_2$ from a fossil-derived hydrocarbon; one or more CO converters to convert CO from the gasification stage, the hydrocarbon processing stage, or both to $H_2$ and $CO_2$; one or more $CO_2$ removal units to remove $CO_2$ and form a combined conversion feed; a conduit to route removed $CO_2$ to a sequestration facility; and a conversion stage to produce a chemical product from the conversion feed.

Other embodiments described herein provide a process for making chemical products, the process comprising providing waste solid sustainable carbon material to a gasifier; reacting the waste solid sustainable carbon material with oxygen and $CO_2$ to gasify the waste solid sustainable carbon material and to produce a first stream comprising CO, $H_2$, $CO_2$, and a mixture of organic compounds; providing a second stream comprising hydrocarbon derived from a fossil source; converting the organic compounds in the first stream and the hydrocarbon in the second stream into CO, $H_2$, and $CO_2$, to form one or more gas streams comprising CO, $H_2$, and $CO_2$; converting at least a portion of CO in the one or more gas streams to $CO_2$ to increase $H_2$ in the one or more gas streams and to form one or more converted streams; separating $CO_2$ from the one or more converted streams to form a conversion feed from the one or more converted streams; sequestering at least a portion of the separated $CO_2$ in a sequestration facility; and producing one or more chemical products from the conversion feed.

BRIEF DESCRIPTION OF THE DRAWINGS

FIG. 3 is a flow sheet comparing aspects of a conventional solid sustainable carbon material to Methanol process with two embodiments of the process of FIG. 2.

FIG. 4 is a flow sheet comparing aspects of a conventional solid sustainable carbon material to FT hydrocarbon process with two embodiments of the process of FIG. 2.

FIG. 5 is a flow sheet comparing aspects of a conventional solid sustainable carbon material to ammonia process with two embodiments of the process of FIG. 2.

FIG. 8 is a flow sheet comparing aspects of a conventional solid sustainable carbon material to Methanol process with three embodiments of the process of FIG. 6.

FIG. 9 is a flow sheet comparing aspects of a conventional solid sustainable carbon material to FT hydrocarbon process with three embodiments of the process of FIG. 6.

FIG. 10 is a flow sheet comparing aspects of a conventional solid sustainable carbon material to ammonia process with two embodiments of the process of FIG. 6.

FIG. 11 is a flow sheet comparing aspects of a solid sustainable carbon material to methanol process for embodiments of the processes of FIGS. 6 and 7.

FIG. 12 is a flow sheet comparing aspects of a solid sustainable carbon material to FT hydrocarbon process for embodiments of the processes of FIGS. 6 and 7.

DETAILED DESCRIPTION

It has been discovered that fossil-derived hydrocarbons from a suitable source, such as a natural gas source, a light hydrocarbon stream from an LPG plant, which may process natural gas or refinery gas into LPG and by-product light hydrocarbons, or another gaseous hydrocarbon stream can be integrated with a solid sustainable carbon material gasification process using CCS to boost syngas and/or $H_2$ output, and thus boost production of chemical products derived from such solid sustainable carbon material, while still maintaining a low environmental burden when measured via the GHG LCA of the produced product. It is possible in the same facility to: (a) convert fossil-derived hydrocarbons into a syngas that can be incorporated into the solid sustainable carbon material gasification to chemicals process, where the incorporation of fossil-derived hydrocarbons into the process generally will contribute to increasing the GHG LCA of the resulting product; and also (b) capture and sequester some (or all) of the biogenic $CO_2$ ($CO_2$ resulting from gasification of solid sustainable carbon material) produced by the gasification process, which generally will contribute to decreasing the GHG LCA of the resulting product. Through innovative integration of these two activities in such a facility it is possible to achieve higher plant productivity with a desired GHG LCA, including an approximately zero GHG LCA (yielding what is sometimes referred to as a "net zero" product). Such integration takes advantage of: (a) the sharing of equipment between the combined processes of solid sustainable carbon material gasification, hydrocarbon conversion, and chemical product synthesis; and (b) sequestration of biogenic $CO_2$ to remove GHGs from the surface environment, and thus to provide a negative GHG LCA contribution that can be used to offset positive GHG LCA contributions in other parts of the process. It is believed that, currently, ways to create net zero chemical products in a process that utilizes a significant amount of fossil-derived hydrocarbon are unknown. It has now been discovered that this challenge can be addressed by offsetting, in a single integrated process and facility, the positive GHG LCA contribution from the use of such fossil-derived hydrocarbon with the sequestration of the biogenic $CO_2$ produced in biogenic material gasification.

Figure 2:
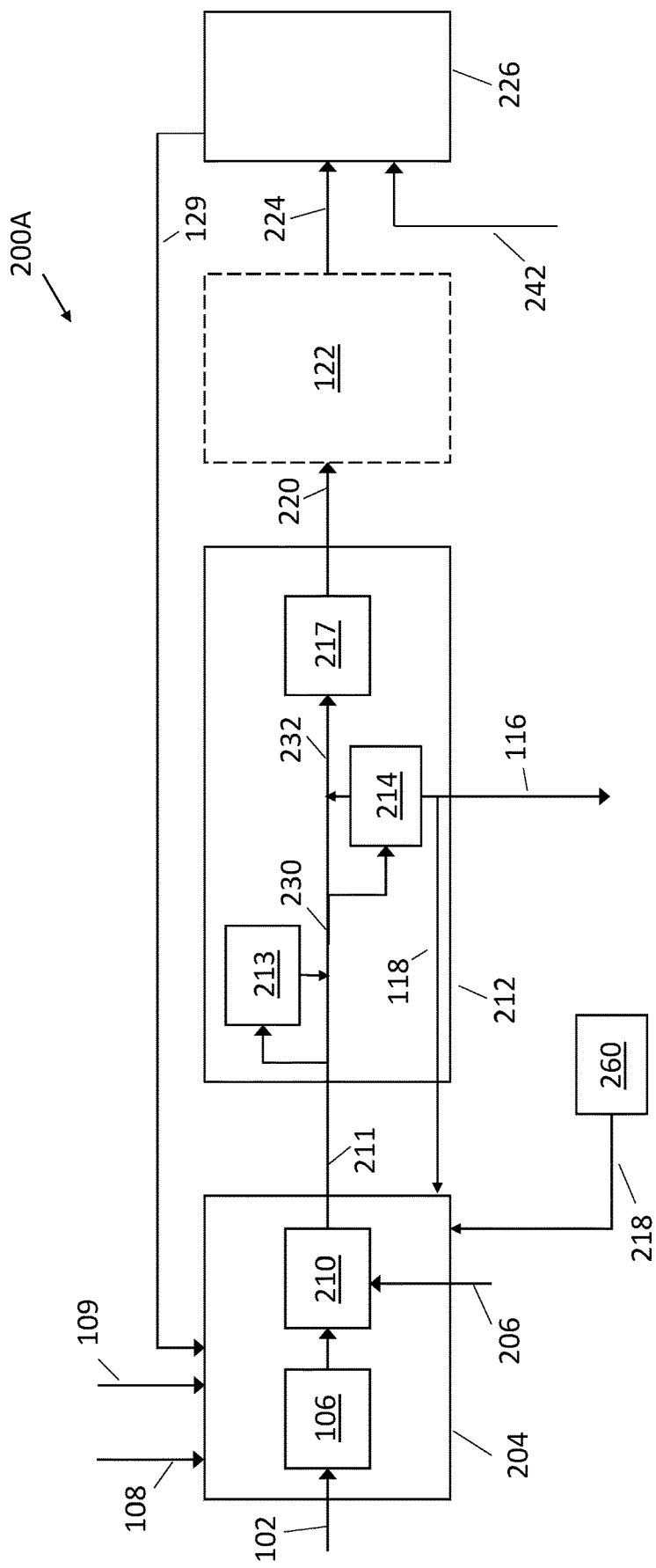
FIG. 2 is a process diagram of a solid sustainable carbon material conversion process according to one embodiment.

FIG. 2 is a process diagram of a solid sustainable carbon material conversion process 200A, according to one embodiment. The solid sustainable carbon material conversion process 200A incorporates a source of fossil-derived hydrocarbon to yield higher quantities of syngas that in turn yield higher quantities of end product for the same amount of solid sustainable carbon input. The hydrocarbon source can be a natural gas stream or a hydrocarbon stream from another process, such as an LPG manufacturing process, which can use natural gas and/or refinery gas as feedstock, or another gaseous hydrocarbon stream.

Figure 1:
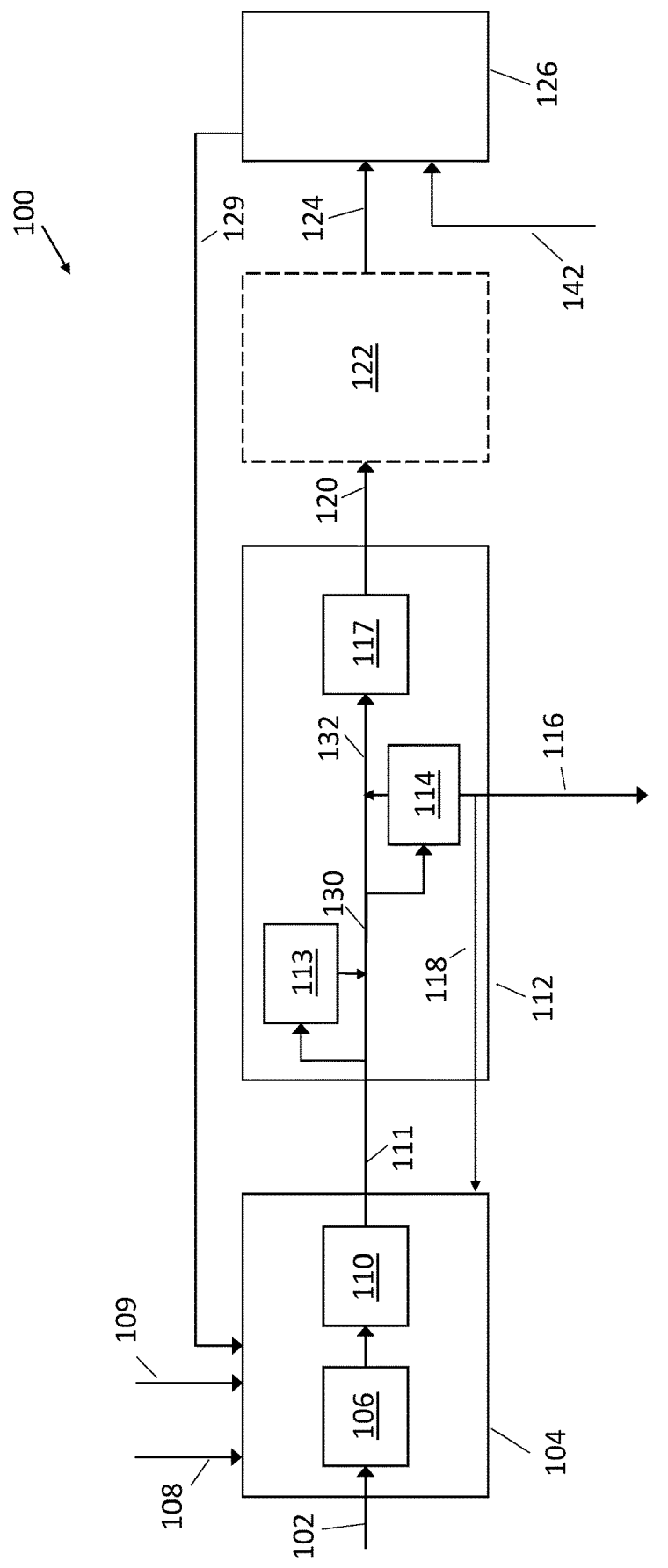
FIG. 1 is a process diagram of a conventional solid sustainable carbon material conversion process.

The solid sustainable carbon material conversion process 200A uses a gasification stage 204, refining stage 212 and conversion stage 226, similar to the corresponding stages 104, 112, and 126 in the process 100 of FIG. 1. The gasification stage 204 has the gasifier 106, but has a converter 210 configured to incorporate an added fossil-derived hydrocarbon material 206. The converter 210 comprises a reactor configured to convert tars and hydrocarbon molecules 206 into syngas. Such reactors are known, and include POX reactors. The fossil-derived hydrocarbon material 206 can be derived from fossil sources such as natural gas or oil, and can include light hydrocarbon molecules having one to three carbon atoms each (i.e. methane, ethane, ethene, ethyne, propane, propene, propyne). The hydrocarbon material 206 can include hydrocarbon molecules of moderate size, as well, for example hydrocarbon molecules having 4-6 carbon atoms. The moderately sized hydrocarbons molecules can be linear, branched, cyclic, aliphatic, or aromatic, and mixtures of C1-C6 molecules can be used. Where any hydrocarbon molecules in the hydrocarbon material 206 may be liquid prior to reaching a processing unit, the hydrocarbon material 206 can be heated to prevent any liquid condensation. Streams having hydrocarbon and non-hydrocarbon molecules can be used as, or added to, the hydrocarbon material 206 after removing the non-hydrocarbon molecules by any suitable means. Examples of hydrocarbon streams that can be used include natural gas, refinery gas, steam cracking feedstocks (ethane, naphtha, and other mixed hydrocarbon streams), steam cracked naphtha, and various C4-C6 streams typically encountered in processing of hydrocarbon materials. Heavier hydrocarbon molecules can also be used, but the heavier hydrocarbons must be converted for use in the processes described herein, with resulting increased energy budget. Heavier hydrocarbons are generally thought to be less efficient in yielding $H_2$ and CO in conversion processes than lighter hydrocarbons or natural gas. The hydrocarbons described herein for use with a solid sustainable carbon material conversion facility may be purified prior to use. For example, where nitrogen may be included in natural gas, the nitrogen can be removed, for example by cryogenic distillation, prior to using the natural gas in the processes herein.

To accommodate the extra flow volume of the hydrocarbon material 206, the converter 210 has expanded capacity relative to the tar converter 110, which would be used solely to convert the tars in the stream produced by gasifier 106. In an example embodiment, the converter 210 is a POX reactor. The process resulting from converting the stream produced by the gasifier 106 and the fossil-derived hydrocarbon material 206 in the converter 210 is a gasification stage effluent 211. Operation of the POX process of the converter 210, in the embodiment described above, can be controlled such that processing of the added hydrocarbon material 206 yields primarily CO and $H_2$, with some $CO_2$ and $H_2O$ produced as by-products.

The gasification stage effluent 211 is routed to a refining stage 212 that uses a CO converter 213, a $CO_2$ removal unit 214, and a purification unit 217 that are similar to those of the process 100 of FIG. 1, but scaled to the increased volume resulting from use of the hydrocarbon material 206. The CO converter 213 converts at least a portion of CO in the gasification stage effluent 211 to $CO_2$ and $H_2$ to form a converted stream 230, which can be the product of converting the entire gasification stage effluent 211 or a portion thereof. The scaling of the individual units 213, 214, and 217 relative to the counterpart units 113, 114, and 117 of the process 100 is not the same since addition of the hydrocarbon material 206 does not in general affect throughput of the units 213, 214, and 217 equally, or even proportionately. As in the process 100, a refining stage effluent 220 is routed to a conversion stage 226 as a conversion feed 224, and a fuel gas, optionally including excess syngas, can be routed from the conversion stage 226 to the gasification stage 204 where the conversion stage 226 produces a by-product that can be used as a fuel gas. As in the process 100, where the conversion stage 226 is an ammonia facility, a nitrogen feed 242 is provided to the conversion stage 226. Such nitrogen feed may be supplied by an air separation unit ("ASU"), and in such case, the same ASU may provide nitrogen feed 242 and oxygen feed 108.

Examples of the process 200A are presented below, compared with an example of the conventional process 100. In the Examples presented below:

A. the solid sustainable carbon material is softwood (e.g. pine) forestry residues collected in the southeastern United States, which is assumed to be suitably sized and dried (to 15% by weight moisture) before feeding to the gasifier;

B. the gasification stages 104 and 204 are provided with an input of 1000 short tons per day (st/d) of such softwood (e.g. pine) forestry residues and 135 metric tonnes per day (mt/d) of $CO_2$;

i. Note that such 1000 stpd solid sustainable carbon material feed represents a feed of 771 dry-mt/d, after converting from short tons (st) to metric tonnes (mt) and accounting for the 15% moisture;

ii. Note that such 771 dry-mt/d feed represents an atomic carbon feed rate of 369 mt/d using a typical value of 50% by mass for the carbon content in softwood;

C. the gasification stage 104 of the conventional process 100 is simulated using the following performance characteristics for the case of 1000 stpd input of such softwood (e.g. pine) forestry residues and 135 mt/d of $CO_2$:
  i. $CO_2$ leakage into the atmosphere=46 mt/d;
  ii. carbon (from the solid sustainable carbon material) converted to ash=31 mt/d;
  iii. tar converter 110 is a POX reactor; and
  iv. the gasification stage effluent 111 has a composition by volume that is 40% CO, 30% $CO_2$, and 30% $H_2$, yielding approximately 505 mt/d CO, 595 mt/d $CO_2$, and 27 mt/d $H_2$, and only trace amounts of other species;

D. the gasification stage 204 of the process 200A is simulated using the following performance characteristics for the case that it is provided with an input of 1000 stpd of such softwood (e.g. pine) forestry residues and 135 mt/d of $CO_2$ plus an additional fossil-derived natural gas feed into the converter 210:
  i. $CO_2$ leakage into atmosphere=46 mt/d;
  ii. carbon (from the solid sustainable carbon material) converted to ash=31 mt/d;
  iii. the converter 210 is a POX reactor;
  iv. a first portion of the gasification stage effluent 211 derived from the solid sustainable carbon material input to the gasification stage 204 is equal in rate and composition to the effluent 111 of the gasification stage 104, which is to say that the first portion of the gasification stage effluent 211 derived from the solid sustainable carbon material input has a composition by volume that is 40% CO, 30% $CO_2$, and 30% $H_2$, yielding approximately 505 mt/d CO, 595 mt/d $CO_2$, and 27 mt/d $H_2$, and only trace amounts of other species; and
  v. a second portion of the gasification stage effluent 211 derived from the fossil-derived natural gas converted in the converter 210 has flow rate and composition computed assuming:
    1. the second portion consists of CO, $CO_2$, and $H_2$, and only trace amounts of other species;
    2. 75% of the carbon in the fossil-derived natural gas is converted into CO, and the remaining 25% is converted into $CO_2$; and
    3. a volumetric ratio of $H_2$:CO in the second portion is equal to 2;

E. the CO converters 113 and 213 are both WGS units that convert 100% of input CO into $H_2$ and $CO_2$ via reaction with water;

F. the $CO_2$ removal units 114 and 214 are both AGR units that remove 100% of input $CO_2$ but also leak 5% of that removed $CO_2$ into the atmosphere;

G. in cases where the conversion stage 126 or 226 produces methanol:
  i. each of the conversion feeds 124 and 224 contains 2.05 moles of $H_2$ for each mole of CO, and 3.05 moles of $H_2$ for each mole of $CO_2$;
  ii. there is no nitrogen source 142 or 242;
  iii. each of the conversion units 126 and 226 converts 96% of the carbon in the respective conversion feeds 124 and 224 into methanol product, with the remaining 4% of the carbon converted into $CO_2$ and emitted into the atmosphere; and
  iv. each of the purification units 117 and 217 includes sulfur removal via a catalytic, chemisorption, and/or physiorption process that does not otherwise change the mass flow rates, so that with respect to CO, $CO_2$, and $H_2$, refining stage effluent 120 is the same as precursor 132 and refining stage effluent 220 is the same as precursor 232;

H. in cases where the conversion stage 126 or 226 produces FT hydrocarbons:
  i. each of the conversion feeds 124 and 224 contains 2.20 moles of $H_2$ for each mole of CO, and 3.20 moles of $H_2$ for each mole of $CO_2$;
  ii. there is no nitrogen source 142 or 242;
  iii. each of the conversion units 126 and 226 converts 96% of the carbon in the respective conversion feeds 124 and 224 into FT hydrocarbon product, with the remaining 4% of the carbon converted into $CO_2$ and emitted into the atmosphere;
  iv. each of the purification units 117 and 217 includes sulfur removal via a catalytic, chemisorption, and/or physiorption process that does not otherwise change the mass flow rates, so that with respect to CO, $CO_2$, and $H_2$, refining stage effluent 120 is the same as precursor 132 and refining stage effluent 220 is the same as precursor 232; and
  v. the fuel gas 229 consists of hydrocarbon and syngas; while it is not shown in the Examples, such fuel gas 229 may be routed to the gasification stage 204 as an additional energy source, for example, as an additional contribution to the hydrocarbon material 206 or as a separate stream.

I. in cases where the conversion stage 126 or 226 produces ammonia:
  i. each of the conversion feeds 124 and 224 contains high purity $H_2$;
  ii. the nitrogen source 142 or 242 contains approximately 3 moles of high purity $N_2$ for each mole of high purity $H_2$ supplied in the respective conversion feeds 124 and 224, and the $N_2$ may be supplied, for example, by an ASU, which may further supply oxygen for the gasification stages 104 and 204 as oxygen source 108;
  iii. each of the conversion stages 126 and 226 converts 96% of the hydrogen in the respective conversion feeds 124 and 224 into an ammonia product, with the remaining 4% converted into $H_2O$ and emitted into the atmosphere; and
  iv. each of the purification units 117 and 217 includes a PSA that produces a high purity $H_2$ stream, in which process 20% of $H_2$ in the stream is removed as tail gas; while it is not shown in the Examples, such tail gas may be recycled for power/energy elsewhere in the facility;

J. the monitoring unit 122 is either not present or does not change the mass flow rates in the input and output streams, such that refining stage effluent 120 is the same as conversion feed 124 and refining stage effluent 220 is the same as conversion feed 224; and K. for the purpose of calculating the GHG LCA contributions, the LCA is assumed to be a "well-to-wake" type that includes the upstream contributions for any feedstock or utility inputs to the production facility, the production process itself, and any downstream end-product transportation, distribution, and use, and reference values and calculation methodologies consistent with the 2022 version of the GREET model provided by the Argonne National Laboratory (accessible at https://greet.es.anl.gov/greet.models as of Dec. 23, 2022) are used, yielding the following GHG LCA contribution metrics in terms of equivalent $CO_2$ emissions ($CO_2$e):
i. for collection/transport of the 1000 st/d of such softwood (e.g. pine) forestry residues=55.7 mt/d;
ii. for electricity supply (assuming 95% renewable power and 5% grid power);
   a. methanol and FT hydrocarbon cases=24.1 mt/d, where all cases are simulated as nominally needing 40 MW of power;
   b. ammonia cases=42.2 mt/d, where all cases are simulated as nominally needing 80 MW of power;
iii. for natural gas supply=0.61 mt/mt of NG supplied;
iv. for downstream product transport and distribution;
   1. for Methanol cases=0.022 mt/mt of product;
   2. for FT hydrocarbon cases=0.012 mt/mt of product, based on available data for transportation of diesel fuel;
   3. for ammonia cases=0.026 mt/mt of product;
v. for downstream use, combustion is assumed, with 100% of the carbon contained in the product converted to $CO_2$ and emitted into the atmosphere; and
vi. for the corresponding baseline GHG LCA for a conventional fossil-derived product;
   1. for methanol cases=1.72 mt/mt of product;
   2. for FT hydrocarbon cases=3.58 mt/mt of product, based on available data for diesel fuel;
   3. for ammonia cases=2.60 mt/mt of product.

The process 200A includes optional use of $CO_2$ in the gasification stage 104 for the gasifier 106, the converter 210, or both. The $CO_2$ recycle line from the $CO_2$ removal unit to the gasification stage 106 can optionally be used, or an external source of $CO_2$ 260 can provide $CO_2$ to the gasification stage 104 (gasifier 106 and/or converter 210) through an external $CO_2$ conduit 218. Each source of $CO_2$ can be used in any suitable ratio or mixture, or only one of the $CO_2$ sources can be used, or none can be used, depending on the embodiment.

FIG. 3 is a flow sheet comparing aspects of a conventional solid sustainable carbon material to methanol process with two embodiments of the process of FIG. 2, each parameterized as set forth above. FIG. 3 additionally shows the GHG LCA of the produced product, and a number of embodiment metrics. It is notable that in the embodiment labeled "CASE 3A" referring to conventional process 100, no natural gas is supplied to the tar converter 110 and the total product output is 318 mt/d. In the process defined by CASE 3A, 43% of the gasification stage effluent 111 is routed to the CO converter 113 (to increase the proportion of $H_2$ in the stream relative to CO), and 100% of the stream 130 is routed to the $CO_2$ removal unit 114. As shown in FIG. 3, the GHG LCA of the final product is highly negative, because 100% of the carbon in the methanol product is biogenic (so its downstream combustion does not produce any net emissions) and a large amount of biogenic $CO_2$ is permanently sequestered, leading to a large net removal of $CO_2$ from the surface environment. In contrast, in the embodiment labeled "CASE 3B" referring to an embodiment of the process 200A, 246 mt/d of natural gas is supplied to the converter 210 via hydrocarbon material 206, and the total methanol output increases to 667 mt/d (about 2.10 times the output of the conventional process 100). In the process defined by CASE 3B, 27% of the gasification stage effluent 211 is routed to the CO converter 213 (to increase the proportion of $H_2$ in the stream relative to CO), a proportion less than in CASE 3A by about 16%, and 100% of the stream 230 is routed to $CO_2$ removal unit 214. In CASE 3B, the GHG LCA of the final product is approximately zero. In simple terms, the process 200A is capable of combining solid sustainable carbon gasification, natural gas reforming via POX, and CCS to produce a maximum amount of net zero methanol product.

It is noteworthy that the current marketplace places relatively high value on chemical product GHG LCA reductions, relative to a baseline for production and use for an equivalent product made from fossil-derived raw materials ("fossil baseline"), down to zero, but relatively low value on further reductions below zero, because reductions below zero must be credited as offsets against other unrelated emissions, increasing emissions tracking overhead and making it more difficult to perform audits and ensure regulatory compliance. As a result, the incremental economic benefits of GHG LCA reductions below zero are much less than those above zero. At the same time, there is a tradeoff between increasing productivity and lowering GHG LCA. For a given project the most economically optimal operating point balances these two factors, and utilizing the inventive embodiments described herein to produce chemical products that have net zero GHG LCA (or values that are modestly above or below zero) provides a means to optimize the GHG LCA reduction value while still achieving a much higher yield relative to a conventional process.

Methanol products with a negative GHG LCA may also be produced via an embodiment of the process 200A. Some embodiments produce methanol products with a GHG LCA that is between −100% and 0% of the equivalent fossil baseline, by supplying a lower amount of natural gas than in CASE 3B at the cost of reduced plant productivity. Alternately, Methanol products with a slightly positive GHG LCA may be produced.

Some embodiments of the process 200A produce methanol products with a GHG LCA that is 20% of the fossil baseline, as in the embodiment labeled "CASE 3C" referring to an embodiment of the process 200A in which 350 mt/d of natural gas is supplied to the converter 210 via hydrocarbon material 206, and the total methanol output increases to 814 mt/d (about 2.56 times the output of the conventional process 100). In the process defined by CASE 3C, 23% of the gasification stage effluent 211 is routed to the CO converter 213 (to increase the proportion of $H_2$ in the stream relative to CO), a proportion less than in CASE 3A by 20% and less than CASE 3B by 4%, and 100% of the stream 230 is routed to the $CO_2$ removal unit 214. Methanol products can also be produced with GHG LCA between 0 and 20% of the fossil baseline by supplying a natural gas feed that is between the amount supplied in CASE 3B and CASE 3C, with resulting productivities that are between these two cases, respectively.

Some embodiments of the process 200A produce methanol products with a GHG LCA that is −50% of the fossil baseline, as in the embodiment labeled "CASE 3D" referring to an embodiment of the process 200A in which 101 mt/d of natural gas is supplied to the converter 210 via hydrocarbon material 206, and the total methanol output is 461 mt/d (about 1.45 times the output of the conventional process 100). In the process defined by CASE 3D, 34% of the gasification stage effluent 211 is routed to the CO converter 213 (to increase the proportion of $H_2$ in the stream relative to CO), and 100% of the stream 230 is routed to the $CO_2$ removal unit 214. Methanol products can also be produced with GHG LCA between 0% and −50% of the fossil baseline by supplying a natural gas feed that is between the amount supplied in CASE 3A and CASE 3D, with resulting productivities that are between these two cases, respectively. Additionally, methanol products can be produced with GHG LCA greater than 20% of the fossil baseline by supplying a natural gas feed that is greater than what is supplied in CASE 3C, resulting, for example, in GHG LCA up to 30%, 40% or 50% of the fossil baseline.

It is noteworthy that in the three embodiments of the process 200A of FIG. 3, one impact of introducing natural gas to the converter 210 is that the carbon atoms in the produced methanol are no longer 100% biogenic (in the sense of being derived from biogenic sources), but rather include 39% fossil carbon atoms in CASE 3B, 48% fossil carbon atoms in CASE 3C, and 21% fossil carbon atoms in CASE 3D. The GHG LCA of each of these cases reflects the production process, including the contribution of fossil-derived natural gas offset by the sequestered biogenic $CO_2$, as well as downstream combustion. However, many regulatory regimes penalize fuels containing fossil-derived carbon atoms, regardless of the GHG LCA, and thus in certain marketplaces there may be a need for an alternative approach that does not produce an end product containing fossil-derived carbon atoms.

A number of useful metrics may be computed with respect to various "external inputs into the process" compared to the product output. "External inputs into the process" herein refers to net material inputs into the process, and accordingly excludes materials that are used solely outside of the process as well as internal recycle streams. For example, if the gasifier 106 or tar converter 110 or 210 utilizes a stream of externally supplied natural gas to fire a combustor to externally heat a reactor chamber, such natural gas feed would not be an "external input into the process" (because such natural gas remains physically outside the process). Similarly, $CO_2$ recycle 118 is not an "external input into the process" (because it is an internal recycle stream), whereas the externally supplied $CO_2$ through $CO_2$ conduit 218 discussed below is an "external input into the process". It is useful to then introduce the following three metrics:

A. the "% of net atomic carbon input into the process from fossil sources," defined herein as the percentage of fossil-derived carbon atoms averaged over all of the external inputs into the process;

B. the "product atomic carbon yield per sustainable atomic carbon input into the process," defined herein as the mass flow of carbon atoms in the product output divided by the mass flow carbon atoms summed over the solid sustainable carbon material input into the process plus any other sustainable carbon external inputs into the process; and C. the "product yield per dry solid sustainable carbon material input into the process," defined herein as the mass flow of product output divided by the dry mass flow of solid sustainable carbon material input into the process.

Embodiments of FIG. 3 share the characteristic that a % of net atomic carbon input into the process from fossil sources (here associated with the hydrocarbon material 206) is significant—32%, 41%, and 16% in CASE 3B CASE 3C, and CASE 3D respectively—whereas none of the atomic carbon feed into the process used in the conventional process 100 is from fossil sources. Note that in the Examples the percentage of net atomic carbon input into the process from hydrocarbons is computed by dividing the atomic carbon flow in the hydrocarbon material 206 by the combined atomic carbon flows of streams 102, 206, and 218 (which will be introduced later). For purposes of computing the percentage of net atomic carbon, streams that are not present in an embodiment would be allocated a value of zero.

Similarly, the embodiments of FIG. 3 share the characteristic that a significant portion of the $CO_2$ directed into by-product 116 and sequestered has a fossil origin (here derived from the hydrocarbon material 206)—31%, 38%, 16% in CASE 3B, CASE 3C, and CASE 3D respectively—whereas none of the $CO_2$ sequestered in the conventional process 100 has a fossil origin. Further, in the embodiments of FIG. 3, the volumetric flow rates of the gasification stage effluent 211 emerging from the converter 210 are substantially increased relative to the corresponding flow rate of the gasification stage effluent 111 emerging from the tar converter 110 of the conventional process 100 (i.e. CASE 3A)—approximately 1.85, 2.21, and 1.35 the value of CASE 3A in CASE 3B, CASE 3C, and CASE 3D respectively. These increases occur in spite of the gasifier 106 being the same in each case, and the rate of solid sustainable carbon usage also being the same in each case, reflecting the impact of using fossil-derived hydrocarbon in the process 200A. Lastly, it is noted that in CASE 3A, the product atomic carbon yield per sustainable atomic carbon input into the process is just 0.31, whereas it is 0.65, 0.79, and 0.45 for CASE 3B, CASE 3C, and CASE 3D respectively, reflecting the higher yields of product relative to the same solid sustainable carbon input. The product yield per dry solid sustainable carbon material input the process follows a similar trend, with CASE 3A having a value of 0.41, while CASE 3B, CASE 3C, and CASE 3D have 0.86, 1.06, and 0.60 respectively.

FIG. 4 is a flow sheet comparing aspects of a conventional solid sustainable carbon material to FT hydrocarbon process with two embodiments of the process 200A of FIG. 2, each configured to produce FT hydrocarbons and parameterized as set forth above. FIG. 4 additionally shows the GHG LCA of the produced product, and a number of embodiment metrics. It is noted that in the embodiment labeled "CASE 4A" referring to conventional process 100, no natural gas is supplied to the tar converter 110 and the total FT hydrocarbon output is 134 mt/d. In the conventional process 100, 45% of the gasification stage effluent 111 is routed to the CO converter 113 (to increase the proportion of $H_2$ in the stream relative to CO), and 100% of the stream 130 is routed to the $CO_2$ removal unit 114. As shown in FIG. 4, the GHG LCA of the FT hydrocarbon product is highly negative, as 100% of the carbon in the FT hydrocarbon product is biogenic (so its downstream combustion does not produce any net emissions) and a large amount of biogenic $CO_2$ is permanently sequestered, leading to a large net removal of $CO_2$ from the surface environment.

In contrast, in the embodiment labeled "CASE 4B," referring to an embodiment of the process 200A, 268 mt/d of natural gas is supplied to the converter 210 via the hydrocarbon material 206, and the total FT hydrocarbon product output increases to 293 mt/d (about 2.19 times the output of the conventional process 100). In the process defined by CASE 4B, 29% of the gasification stage effluent 211 is routed to the CO converter 213 (to increase the proportion of $H_2$ in the stream relative to CO), a proportion less than in CASE 4A by about 16%, and 100% of the stream 230 is routed to the $CO_2$ removal unit 214. In CASE 4B, the GHG LCA of the FT hydrocarbon product is approximately zero. Just as with the embodiments of the process 200A shown in FIG. 3 with respect to methanol, the process 200A effectively combines solid sustainable carbon gasification, natural gas reforming via POX, and CCS to produce a maximum amount of net zero FT hydrocarbon product.

FT hydrocarbon products with a slightly negative GHG LCA may also be produced via an embodiment of the process 200A. Some embodiments produce hydrocarbon products with a GHG LCA that is between −100% and 0% of the fossil baseline, by supplying a lower amount of natural gas than in CASE 4B at the cost of reduced plant productivity. Alternately, FT hydrocarbon products with a slightly positive GHG LCA may be produced. Some embodiments of the process 200A produce hydrocarbon products with a GHG LCA that is 20% of the fossil baseline, as in the embodiment labeled "CASE 4C" referring to an embodiment of the process 200A. In CASE 4C, 376 mt/d of natural gas is supplied to the converter 210 via the hydrocarbon material 206, and the total hydrocarbon product output increases to 357 mt/d (about 2.67 times the output of the conventional process 100). In CASE 4C, 26% of the gasification stage effluent 211 is routed to the CO converter 213 (to increase the proportion of $H_2$ in the stream relative to CO) a proportion less than in CASE 4A by about 19% and less than in CASE 4B by about 3%, and 100% of the stream 230 is routed to the $CO_2$ removal unit 214. Hydrocarbon products can also be produced with between 0 and 20% of the fossil baseline GHG LCA by supplying a natural gas feed that is between the amount supplied in CASE 4B and CASE 4C, with resulting productivities that are between these two cases, respectively. Alternately, hydrocarbon products can be produced with GHG LCA greater than 20% of the fossil baseline by supplying a natural gas feed that is greater than that supplied in CASE 4C, resulting, for example, in GHG LCA up to 30%, 40% or 50% of the fossil baseline. Some embodiments of the process 200A produce hydrocarbon products with a GHG LCA that is −50% of the fossil baseline, as in the embodiment labeled "CASE 4D" referring to an embodiment of the process 200A in which 117 mt/d of natural gas is supplied to the converter 210 via hydrocarbon material 206, and the total hydrocarbon output is 203 mt/d (about 1.52 times the output of the conventional process 100). In the process defined by CASE 3D, 36% of the gasification stage effluent 211 is routed to the CO converter 213 (to increase the proportion of $H_2$ in the stream relative to CO), and 100% of the stream 230 is routed to the $CO_2$ removal unit 214. Hydrocarbon products can also be produced with GHG LCA between 0% and −50% of the fossil baseline by supplying a natural gas feed that is between the amount supplied in CASE 4A and CASE 4D, with resulting productivities that are between these two cases, respectively.

It is noteworthy that in the three embodiments of the process 200A simulated in FIG. 4, one impact of introducing natural gas to the converter 210 is that the carbon in the produced hydrocarbon is no longer 100% biogenic, but rather contains 41% fossil-derived carbon atoms in CASE 4B, 49% fossil-derived carbon atoms in CASE 4C, and 23% fossil-derived carbon atoms in CASE 4D. Again, the GHG LCA of each of these cases includes production, including the contribution of fossil-derived natural gas, offset by the sequestered biogenic $CO_2$, and downstream combustion. However, as noted above in the context of methanol production, many regulatory regimes penalize fuels containing fossil-derived carbon atoms, regardless of the GHG LCA, and thus in certain marketplaces there may be a need for an alternative approach that does not produce an end product containing fossil-derived carbon atoms.

Embodiments of FIG. 4 share the characteristic that a significant percentage of the total atomic carbon feed into the process has a fossil origin (here associated with hydrocarbon material 206)—34%, 42%, and 19% in CASE 4B, CASE 4C, and CASE 4D, respectively—whereas none of the carbon used in the conventional process has a fossil origin. Similarly, the embodiments of FIG. 4 share the characteristic that a significant portion of the $CO_2$ directed into by-product 116 for sequestration has a fossil origin (here again derived from the hydrocarbon material 206)—33%, 40%, and 18% for CASE 4B, CASE 4C, and CASE 4D respectively—whereas none of the $CO_2$ sequestered in the conventional process 100 has a fossil origin. Further, in the embodiments of FIG. 4, the volumetric flow rates of the gasification stage effluent 211 emerging from the converter 210 are substantially increased relative to the corresponding flow rate of gasification stage effluent 111 emerging from the tar converter 110 of the conventional process 100 (i.e. CASE 4A)—approximately 1.93, 2.30, and 1.41 times in CASE 4B, CASE 4C, and CASE 4D, respectively. These increases occur in spite of the gasifier 106 being the same in each case, and the rate of solid sustainable carbon usage also being the same in each case, reflecting the impact of using fossil-derive hydrocarbon in the process 200A. Lastly, it is noted that in CASE 4A, the product atomic carbon yield per sustainable atomic carbon input into the process is just 0.29, whereas it is 0.65, 0.79, and 0.45 for CASE 4B, CASE 4C, CASE 4D respectively, reflecting the much higher yield of product relative to the same solid sustainable carbon input. The product yield per dry solid sustainable carbon material input the process follows a similar trend, with CASE 4A having a value of 0.17, while CASE 4B, CASE 4C, and CASE 4D have 0.38, 0.46, 0.26 respectively.

FIG. 5 is a flow sheet comparing aspects of a conventional solid sustainable carbon material to ammonia process with two embodiments of the process 200A of FIG. 2, each configured for ammonia production and parameterized as set forth above. FIG. 5 additionally shows the GHG LCA of the produced product, and a number of embodiment metrics. It is noted that in the embodiment labeled "CASE 5A" referring to conventional process 100, no natural gas is supplied to the tar converter 110 and the total product output is 275 mt/d. In this process, 100% of the gasification stage effluent 111 is routed to the CO converter 113 to convert substantially all of the CO into $CO_2$ to maximize the production of $H_2$, and 100% of the stream 130 is routed to the $CO_2$ removal unit 114, to remove substantially all of the $CO_2$, resulting in a stream that is substantially all $H_2$, which is useful for the ammonia production process. As shown in FIG. 5, the GHG LCA of the ammonia product is highly negative, because ammonia contains no carbon and subsequent combustion thereof releases no $CO_2$, while at the same time sequestration of the biogenic $CO_2$ produced by gasification (excepting the portion that leaks from the overall system), representing substantially all carbon input to the process, provides a very large net removal of $CO_2$ from the surface environment.

In contrast, in the embodiment labeled "CASE 5B" referring to an embodiment of the process 200A, 1400 mt/d of natural gas is supplied to the converter 210 via the hydrocarbon material 206, and the total ammonia output increases to 1988 mt/d (about 7.24 times the output of the conventional process 100). In the process defined by CASE 5B, 100% of the gasification stage effluent 211 is routed to the CO converter 213 to convert substantially all of the CO into $CO_2$ to maximize the production of $H_2$, and 100% of the stream 230 is routed to the $CO_2$ removal unit 214, to remove substantially all of the $CO_2$. As shown in FIG. 5, the GHG LCA of the ammonia product in CASE 5B is approximately zero. Just as with the embodiments in FIGS. 3 and 4, the embodiments of the process 200A simulated in FIG. 5 effectively combine solid sustainable carbon gasification, natural gas reforming via POX, and CCS to produce the maximum amount of net zero ammonia product.

Ammonia products with a slightly negative GHG LCA may also be produced via an embodiment of the process 200A. Some embodiments produce ammonia products with a GHG LCA that is between −100% and 0% of the fossil baseline by supplying a lower amount of natural gas than in CASE 5B at the cost of reduced plant productivity. Alternately, ammonia products with a slightly positive GHG LCA may be produced. Some embodiments of the process 200A produce ammonia products with a GHG LCA that is 10% of the fossil baseline, as in the embodiment labeled "CASE 5C" referring to an embodiment of the process 200A in which 2600 mt/d of natural gas is supplied to the converter 210 via the hydrocarbon material 206, and the total ammonia product output increases to 3457 mt/d (about 12.58 times the output of the conventional process 100). Ammonia products can also be produced with a GHG LCA that is between 0 and 10% of the fossil baseline by supplying an amount of natural gas to the converter 210 that is in between the amount supplied in CASE 5B and CASE 5C, with resulting productivities that are between these two cases respectively. Or ammonia products can be produced with GHG LCA greater than 10% of the fossil baseline by supplying an amount of natural gas to the converter 210 that is greater than what is supplied in CASE 5C. Some embodiments of the process 200A produce ammonia products with a GHG LCA that is −50% of the fossil baseline, as in the embodiment labeled "CASE 5D" referring to an embodiment of the process 200A in which 315 mt/d of natural gas is supplied to the converter 210 via hydrocarbon material 206, and the total ammonia output is 660 mt/d (about 2.40 times the output of the conventional process 100). Ammonia products can also be produced with GHG LCA between 0% and −50% of the fossil baseline by supplying a natural gas feed that is between the amount supplied in CASE 5A and CASE 5D, with resulting productivities that are between these two cases, respectively. One noteworthy simplification in the production of ammonia relative to methanol and FT hydrocarbons is that the end product does not contain carbon, avoiding any need (as encountered above in the context of methanol and FT hydrocarbons) to modify the process so the end product contains no fossil-derived carbon as a way to maximize product value in certain markets.

The inventive embodiments in FIG. 5 share the characteristic that a significant percentage of the total atomic carbon feed into the process has a fossil origin (here again associated the hydrocarbon material 206)—73%, 83%, and 38% in CASE 5B, CASE 5C, and CASE 5D respectively—whereas none of the carbon used the conventional process 100 has a fossil origin. Similarly, the embodiments of FIG. 5 share the characteristic that a significant portion of the $CO_2$ sequestered has a fossil origin (here again derived from the hydrocarbon material 206)—75%, 87%, and 41% in CASE 5B, CASE 5C, and CASE 5D respectively—whereas none of the $CO_2$ sequestered in the conventional process 100 has a fossil origin. Further, in the embodiments in FIG. 5, the volumetric flow rates gasification stage effluent 211 emerging from the converter 210 are substantially increased relative to the corresponding flow rates of the gasification stage effluent 111 emerging from the tar converter 110 of the conventional process 100—approximately 5.85, 10.01, 2.09 times in CASE 5B, CASE 5C, and CASE 5D respectively. These increases occur in spite of the gasifier 106 being the same in each case, and the rate of solid sustainable carbon usage also being the same in each case, reflecting the impact of using fossil-derived carbon in the process 200A. Lastly, it is noted that in CASE 5A, the product yield per dry solid sustainable carbon material input the process is just 0.36, whereas it is 2.58, 4.48, and 0.86 for CASE 5B, CASE 5C, and CASE 5D respectively, reflecting the much higher yield of product relative to the same solid sustainable carbon input.

In general the processes 100 and 200A may be operated to produce hydrogen as an end product through appropriate plant configuration where no conversion stage 126 or 226 is included. For example, the ammonia unit can be omitted and the rest of the process 200A operated as shown in FIG. 5. The conversion feeds 124 and 224 in the ammonia process of FIG. 5 consist of high purity $H_2$, and as noted in the description of the process 200A, the purification units 117 and 217 can include a PSA that removes impurities from the intermediate precursors 132 and 232. In such an embodiment, in which the conversion stage 126 or 226 is omitted and the conversion feeds 124 and 224 may be routed to other downstream use, the resulting hydrogen could be delivered, for example, to hydrogen trucks or pipelines for transport, distribution, and/or for use in road transportation, industrial processing, chemical production, or power generation. It is readily observed that for such a hydrogen end product application, for each of the simulated ammonia cases in FIG. 5 one would expect similar embodiment metrics but using the $H_2$ flow in conversion feeds 124 and 224 as the end product output; namely:

A. In analogy to CASE 5A: With 0 mt/d natural gas input into the hydrocarbon material 206, the high purity hydrogen output would be 51 mt/d, and the product yield per dry solid sustainable carbon material input into the process would be 51/771=0.066; all other embodiment metrics for CASE 5A would be the same, excluding the "Ammonia Product Output Relative to 100 Case" which is not applicable.

B. In analogy to CASE 5B: With 1400 mt/d natural gas input into the hydrocarbon material 206, the high purity hydrogen output would be 366 mt/d, and the product yield per dry solid sustainable carbon material input into the process would be 366/771=0.47; all other embodiment metrics for CASE 5A would be the same, excluding the "Ammonia Product Output Relative to 100 Case" which is not applicable.

C. In analogy to CASE 5C: With 2600 mt/d natural gas input into the hydrocarbon material 206, the high purity hydrogen output would be 636 mt/d, and the product yield per dry solid sustainable carbon material input into the process would be 636/771=0.82; all other embodiment metrics for CASE 5A would be the same, excluding the "Ammonia Product Output Relative to 100 Case" which is not applicable.

D. In analogy to CASE 5D: With 315 mt/d natural gas input into the hydrocarbon material 206, the high purity hydrogen output would be 121 mt/d, and the product yield per dry solid sustainable carbon material input into the process would be 121/771=0.16; all other embodiment metrics for CASE 5A would be the same, excluding the "Ammonia Product Output Relative to 100 Case" which is not applicable.

Typically the GHG LCA for a hydrogen end product application is calculated "well-to-gate" instead of "well-to-wake" as here with methanol, hydrocarbons, and ammonia. The difference is that in the "well-to-gate" case, emission contributions from transportation, distribution, and use are not included. Since the downstream contributions from ammonia are small, it is readily observed that the net zero GHG LCA CASE 5B should produce approximately net zero hydrogen when adapted to produce hydrogen as an end product. And similarly one would expect that the 10% of fossil GHG LCA CASE 5C should produce modestly positive GHG LCA hydrogen and the −50% fossil GHG LCA CASE 5D should produce moderately negative GHG LCA hydrogen In the embodiments of FIG. 5, 20% of the $H_2$ stream is removed as tail gas in connection with purification by a PSA in 217, due to the high purity requirements for ammonia synthesis. When producing $H_2$ as an end product, a lower purity may be acceptable, and in such cases the purification units 117 and 217 may be altered or controlled to provide higher yield by using, for example, a PSA with a lower output $H_2$ purity rating or a methanation unit. In some cases, the PSA unit can be omitted entirely where a certain amount of CO and/or $CO_2$ contamination is acceptable.

Figure 6:
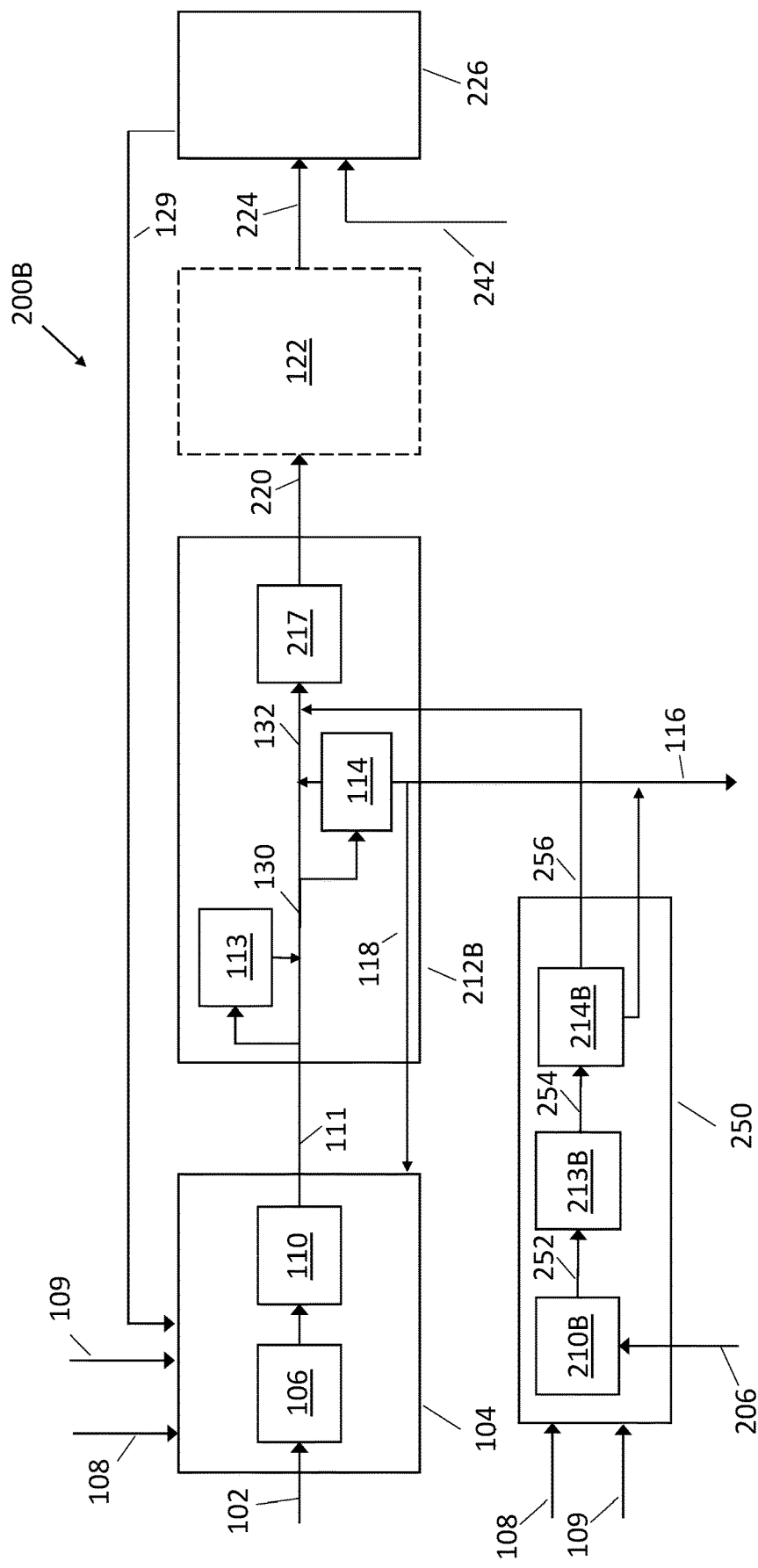
FIG. 6 is a process diagram of a solid sustainable carbon material conversion process according to another embodiment.

FIG. 6 is a process diagram of a solid sustainable carbon material conversion process 200B, according to another embodiment. Just as in the solid sustainable carbon material conversion process 200A, the process 200B uses a source of fossil-derived hydrocarbon to yield higher quantities of syngas that in turn yield higher quantities of end product for the same amount of solid sustainable carbon input. However, a key difference in 200B vs 200A is that in cases where the end product is a carbon containing material, such as methanol or hydrocarbons, the process 200B produces an end product that contains little to substantially no fossil-derived carbon, while otherwise maintaining approximately the same GHG LCA and end product output. Particularly, in process 200B of FIG. 6, conversion of organics from gasifying the solid sustainable carbon material is performed in the tar converter 110 while conversion of hydrocarbon is performed in a separate hydrocarbon converter 2101B, further described below. In contrast, process 200A of FIG. 2 converts organic material and hydrocarbon in the same reactor or converter 210.

In process 200B, the gasification stage 104 that uses sized and dried solid sustainable carbon material 102 contains a gasification unit 106 and tar converter 110, and produces a gasification stage effluent 111 containing CO, $H_2$, and $CO_2$, and may use oxygen source 108 and steam source 109, just as in the conventional process 100. Additionally, just as in process 100, there is a refining stage, here 212B, that contains a CO converter 113 (and bypass) for selectively routing a portion of the gasification stage effluent 111 for CO conversion to increase the $H_2$ content of the gasification stage effluent 111 relative to CO. The process 200B also has the $CO_2$ removal unit 114 (and bypass) for removing $CO_2$ from intermediate stream 230, wherein the $CO_2$ removal unit 114 yields a stream of removed $CO_2$ which may be directed, in part or wholly, into $CO_2$ recycle 118 for recycling back into gasification stage 104 and into by-product 116, in part or wholly, for sequestration. Unlike the conventional process 100, a hydrocarbon processing stage effluent 256, product of the hydrocarbon processing stage 250, is combined with precursor 132 downstream of the $CO_2$ removal unit 114. This combined stream may then be directed through purification unit 217, if further purification is required, similar to the process 200A of FIG. 2. Then the resulting refining stage effluent 220 may be directed through the monitoring unit 122, if present, resulting in conversion feed 224 which is then directed into conversion stage 226.

The process 200B has a fossil hydrocarbon processing stage 250 to produce the hydrocarbon processing stage effluent 256. The hydrocarbon processing stage 250 includes the hydrocarbon converter 210B which uses a reactor or reaction facility configured to convert the hydrocarbon material 206 into syngas. Such facilities are known, and include steam methane reforming (SMR) facilities, autothermal reforming (ATR) facilities, and POX facilities. The hydrocarbon material 206, derived from fossil sources, is introduced into the process 200B as an input to the hydrocarbon converter 210B within the hydrocarbon processing stage 250. The hydrocarbon material 206 used with the process 200B can have the same source and composition as any of the hydrocarbon streams described above in connection with the process 200A. In some embodiments, the hydrocarbon converter 210B is sized to convert a hydrocarbon stream with a mass flow rate of atomic carbon that is at least 15% of the net mass flow rate of atomic carbon input to the overall process. That is to say, in some embodiments, the hydrocarbon converter 210B handles at least 15% of atomic carbon input to the process.

The hydrocarbon converter 210B produces an effluent 252 containing substantially syngas and $CO_2$, which is then routed to a second CO converter 213B, which may be a WGS unit, to produce an intermediate 254 that is substantially $H_2$ and $CO_2$. Intermediate 254 is then routed to a second $CO_2$ removal unit 214B, which may be an AGR unit, to produce the hydrocarbon processing stage effluent 256. The second $CO_2$ removal unit 214B produces a stream of $CO_2$ that is then routed for sequestration, either combined with by-product 116 or separately. A second purification unit (not shown) may be used immediately after the second $CO_2$ removal unit 214B, which may be a PSA or methanation unit, if further purification of the hydrocarbon processing stage effluent 256 is desired.

In the process 200B, substantially all the fossil-derived carbon from the hydrocarbon material 206 is converted to $CO_2$ and sequestered. Whereas embodiments of process 200A and 200B may be engineered to have similar inputs, outputs, and GHG LCA product values, the process 200B inherently has a lower degree of system integration, since the process 200A has a single conversion unit 210, whereas in 200B the tar converter 110 and the hydrocarbon converter 210B are separate. Similarly, in the process 200A, there is a single CO converter 213 and a single $CO_2$ removal unit 214, whereas in the process 200B there are two CO converters, a first CO converter 113 and a second CO converter 213B, and two $CO_2$ removal units, a first $CO_2$ removal unit 114 and a second $CO_2$ removal unit 214B. However, in both processes 200A and 200B the same facility infrastructure, including utilities, may be efficiently shared by building an integrated process and facility in a single location, and the downstream modules from 217 onward may be shared.

Figure 7:
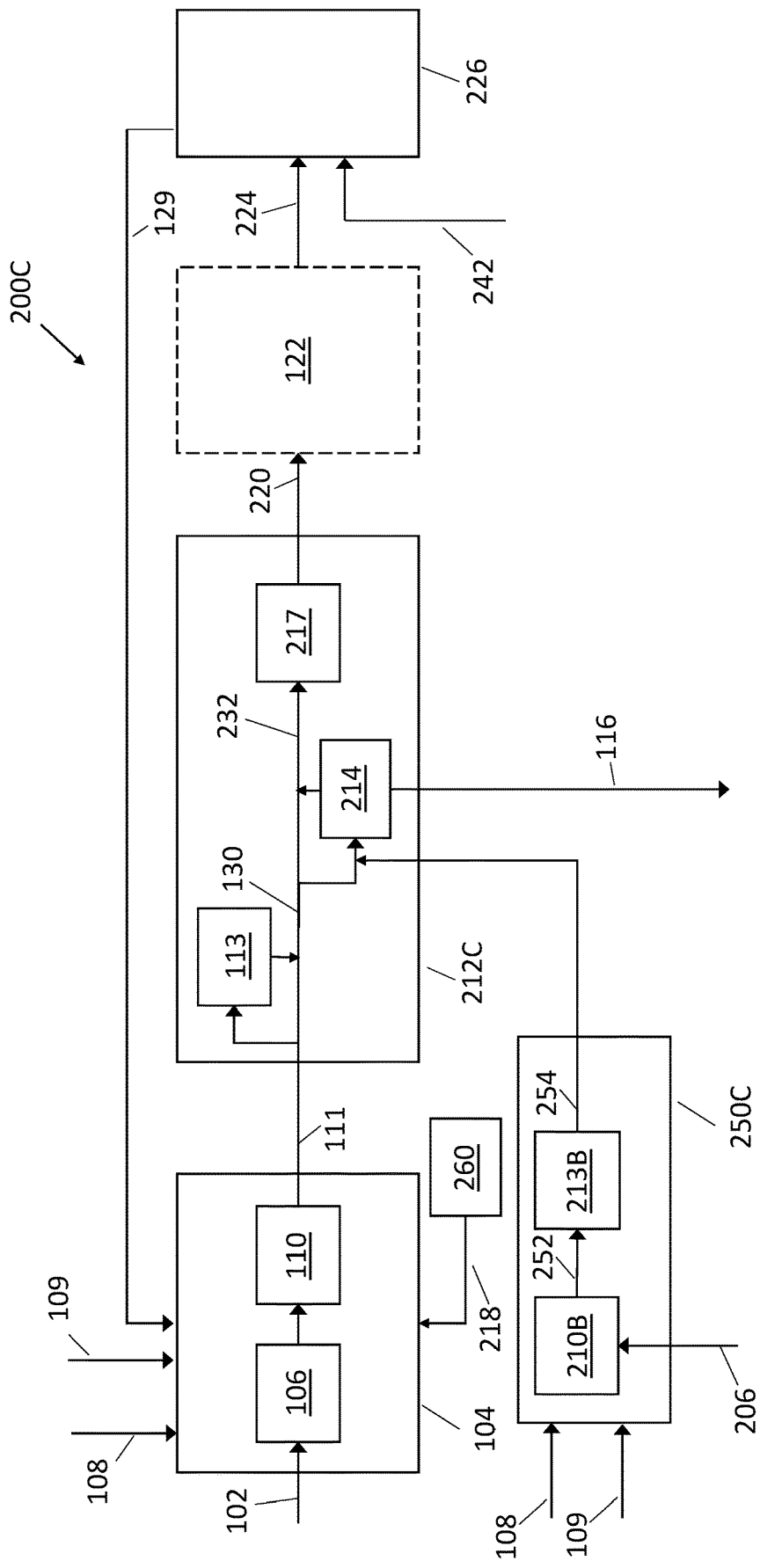
FIG. 7 is a process diagram of a solid sustainable carbon material conversion process according to another embodiment.

FIG. 7 is a process diagram of a solid sustainable carbon material conversion process 200C according to another embodiment. Where no $CO_2$ is returned from the $CO_2$ removal unit 214 to the gasification stage 104, the process 200C includes a hydrocarbon processing stage 250C that has no $CO_2$ removal unit (the $CO_2$ removal unit 214B of the process 200B is omitted from the hydrocarbon processing stage 250C). Because no $CO_2$ is returned to the gasification stage 104, the intermediate 254 can be a hydrocarbon processing effluent that contains $H_2$ as well as $CO_2$ derived from fossil sources. The hydrocarbon processing effluent, 254 in this case, is routed to the $CO_2$ removal unit 214, included in the refining stage 212C of the process 200C instead of the $CO_2$ removal unit 114, to remove substantially all (e.g. >90%, >95%, or >95%) of the $CO_2$, fossil-derived and biogenic, from the intermediate 254 and the portion of the intermediate 130 routed for $CO_2$ removal.

The process 200C produces a carbon containing product that has little to substantially no fossil carbon, but with fewer processing units. Relative to process 200B, in process 200C, the $CO_2$ recycle 118 has been removed, the two CO removal units 114 and 214B have been replaced by the single unit 214 (similar to the unit in the process 200A), and the intermediate 254 of the process 200B is instead routed directly to the $CO_2$ removal unit 214 along with the portion of stream 130 diverted for $CO_2$ removal, so as to produce a precursor 232 that is substantially free of fossil carbon (provided, as noted below, the added $CO_2$ stream 218 is itself substantially free of fossil-derived carbon). It can be readily observed that since intermediate 254 contains substantially $H_2$ and fossil-derived $CO_2$, and substantially all of the $CO_2$ in intermediate 254 is removed by the $CO_2$ removal unit 214 without recycling any of the removed $CO_2$ back into the process through recycle 118, then the precursor 232 is substantially free of fossil-derived carbon, and products resulting from the precursor 232 are also substantially free of fossil-derived carbon.

A source of $CO_2$ 260 can be provided to supply $CO_2$ to the gasification stage 104 using a $CO_2$ conduit 218, if needed. If not needed, the $CO_2$ source 260 and $CO_2$ conduit 218 may be omitted, ensuring that no fossil-derived $CO_2$ enters the gasification stage 104. The $CO_2$ source 260 may be, or may include, any or all of a $CO_2$ pipeline, a $CO_2$ capture system that captures $CO_2$ from another industrial process, or a direct air capture (DAC) facility that removes $CO_2$ directly from the atmosphere. In the case that the $CO_2$ delivered using the conduit 218 is substantially biogenic, there can be substantially no fossil-derived $CO_2$ entering the gasification stage 104. If instead the $CO_2$ delivered using confuit 218 contains fossil-derived $CO_2$, then the $CO_2$ conduit 218 will add fossil-derived $CO_2$ to the precursor 232 and downstream products. With respect to producing a carbon containing product such as methanol or hydrocarbon that is substantially free of fossil-derived carbon, use of a $CO_2$ source that is biogenic, such as a DAC process or $CO_2$ captured an industrial process that produced biogenic $CO_2$, in the process 200C, may be superior to the process 200B in cases where such biogenic $CO_2$ source 260 can be secured economically.

Example embodiments of the processes 200B and 200C are simulated below. The parameters and assumptions introduced above apply to the simulated processes 200B and 200C, below, with the following additions:

A. the hydrocarbon conversion unit 210B is a POX reactor in which:
 1. the output stream 252 is mostly CO, $CO_2$, and $H_2$, and only trace amounts of other species;
 2. the hydrocarbon material 206 is a natural gas stream, and 75% of the carbon in the hydrocarbon material 206 is converted into CO, and the remaining 25% is converted into $CO_2$; and,
 3. a volumetric ratio of $H_2$:CO in the output stream 252 is equal to 2;

B. the CO converter 213B is a WGS unit that converts 100% of the input CO into $H_2$ and $CO_2$ via reaction with water; and C. the $CO_2$ removal unit 214B is an AGR unit that removes 100% of the input $CO_2$ from the process and in so doing leaks 5% of that removed $CO_2$ into the atmosphere.

FIG. 8 is a flow sheet comparing the conventional solid sustainable carbon material conversion process 100, simulated as CASE 3A described above, with three embodiments of the solid sustainable carbon material conversion process 200B, parameterized as set forth above and configured for the production of methanol. FIG. 8 additionally shows the GHG LCA of the produced product, and a number of embodiment metrics. In the embodiment labeled "CASE 8B" referring to an embodiment of the process 200B, 246 mt/d of natural gas is supplied to the hydrocarbon converter 210B via hydrocarbon material 206, and the total methanol product output increases to 666 mt/d. In the process 200B, none of the gasification stage effluent 111 is routed to the first CO converter 113 since there is no need to increase the proportion of $H_2$ therein, and 69% of the stream 130 is diverted into the first $CO_2$ removal unit 114 to remove substantially all of the biogenic $CO_2$ from the diverted stream. Additional $H_2$ to boost the amount of $H_2$ in the refining stage effluent 220 is supplied by hydrocarbon processing stage effluent 256. The GHG LCA of the resulting methanol product is approximately zero.

It is noted that the natural gas input, methanol product, and GHG LCA in CASE 8B are approximately the same as in corresponding CASE 3B, indicating that process 200B (simulated in CASE 8B) and process 200A (simulated in CASE 3B) have approximately the same overall process performance. Similarly, in both CASE 8B and CASE 3B, the % of net atomic carbon input into process from natural gas is 29%, and total sequestered $CO_2$ is approximately 920 mt/d. In CASE 8B, 0% of the carbon in the methanol product is fossil-derived carbon, whereas in CASE 3B 40% of the carbon in the methanol product is fossil-derived carbon. CASE 8B results in more fossil-derived carbon being routed to by-product 116 for sequestration and more biogenic carbon retained in the main process (by reducing, as noted above, the portion of gasification stage effluent 111 that flows into CO converter 113 and the portion of stream 130 that flows into $CO_2$ removal unit 114 compared to the corresponding values in CASE 3B). The increase in fossil-derived $CO_2$ directed to sequestration in CASE 8B, relative to CASE 3B, is observed in the proportion of $CO_2$ by-product 116 that is fossil-derived $CO_2$, which is 31% in CASE 3B and 70% CASE 8B.

CASE 8C reflects a similar relationship to CASE 3C as described above for CASE 8B and CASE 3B. In both cases the input natural gas (and share of fossil-derived carbon in the input carbon streams), output methanol product, and GHG LCA are all approximately the same, while the proportion of fossil-derived carbon in the methanol product is 0% for CASE 8C and 48% for CASE 3C. Methanol free of fossil-derived carbon is achieved in CASE 8C by increasing the amount of fossil-derived $CO_2$ routed to sequestration and retaining an equal amount of biogenic carbon in the main process by reducing the portion of gasification stage effluent 111 that flows into CO converter 113 and the portion of stream 130 that flows into $CO_2$ removal unit 114 compared to the corresponding values in CASE 3C.

CASE 8D is a modified version of CASE 8C in which additional natural gas is supplied (here 390 mt/d vs 350 mt/d in CASE 8C) so that there is sufficient hydrogen available to fully consume all of the available biogenic carbon and maximize the production of 100% biogenic methanol, with a yield of 870 mt/d (approximately 2.74 times the conventional CASE 3A, process 100, value.) In this case, no biogenic $CO_2$ is sequestered, as reflected by the fact that 100% of the $CO_2$ by-product 116 is fossil-derived $CO_2$. It is not possible to further increase the methanol output in this process 200B with further increases in natural gas input as there are no more biogenic carbon atoms to divert to the conversion stage 226 for conversion to product and none of the fossil-derived carbon from the natural gas input reaches the conversion stage 226. This contrasts with process 200A, in which increasing natural gas supplies adds carbon to the conversion stage 226, driving increased output (with a correspondingly higher GHG LCA product that also has a correspondingly higher share of fossil atomic carbon.) The GHG LCA of the methanol produced in CASE 8D is about 26% of the fossil baseline—a modest increase over the CASE 8C value of 20%. For CASE 8D, the % of net atomic carbon input to the process from natural gas is 43%, the product atomic carbon yield per sustainable atomic carbon input into the process is 0.85, and the product yield per dry solid sustainable carbon material input into the process is 1.13.

FIG. 9 is a flow sheet comparing the previously introduced conventional solid sustainable carbon material conversion process 100, simulated in CASE 4A as producing FT hydrocarbons, and three embodiments of the solid sustainable carbon material conversion process 200B, parameterized as set forth above and configured for the production of FT hydrocarbons. FIG. 9 additionally shows the GHG LCA of the produced hydrocarbons, and a number of embodiment metrics. In the embodiment labeled "CASE 9B" referring to an embodiment of the process 200B, 266 mt/d of natural gas is supplied to the hydrocarbon converter 210B via the hydrocarbon material 206, and the total hydrocarbon product output increases to 292 mt/d. In this embodiment of the process 100, none of the gasification stage effluent 111 is routed to the first CO converter 113 since there is no need to increase the proportion of $H_2$ share in the stream, and 70% of the intermediate stream 130 is diverted into the first $CO_2$ removal unit 114. Additional hydrogen is supplied in the hydrocarbon conversion stage effluent 256.

The GHG LCA of the hydrocarbon product is approximately zero in CASE 9B. It is notable that the natural gas input, hydrocarbon product, and GHG LCA in CASE 9B are approximately the same as in corresponding CASE 4B, indicating that process 200B (simulated in CASE 9B) and process 200A (simulated in CASE 4B) have approximately the same overall process performance. Similarly, in both CASE 9B and CASE 4B the % of net atomic carbon input into process from natural gas is 31%, and total sequestered $CO_2$ is approximately 978 mt/d. In CASE 9B, however, 0% of the carbon in the hydrocarbon product is fossil-derived carbon, whereas in CASE 9B 41% of the carbon in the hydrocarbon product is fossil-derived carbon. CASE 9B results in more fossil-derived carbon being routed to the $CO_2$ by-product 116 while retaining an equal amount of additional biogenic carbon in the main process (by reducing, as noted above, the portion of the gasification stage effluent 111 that flows into the CO converter 113 and the portion of stream 130 that flows into the first $CO_2$ removal unit 114 compared to CASE 4B. The increase in fossil-derived $CO_2$ directed to sequestration is observed in the proportion of the $CO_2$ by-product 116 that is fossil-derived $CO_2$, which is 25% in CASE 9B and 70% in CASE 9B.

CASE 9C reflects a similar relationship to CASE 4C as described above for CASE 9B and CASE 4B. In both cases (CASE 9C and CASE 4C) the input natural gas (and proportion of fossil-derived carbon in the input carbon streams), output hydrocarbon product, and GHG LCA are all approximately the same, while the proportion of fossil-derived carbon the methanol product is 0% for CASE 9C and 49% for CASE 4C. CASE 9C also results in more fossil-derived carbon directed to sequestration while retaining an equal amount of additional solid sustainable carbon in the main process by reducing the portion of the gasification stage effluent 111 that flows into the CO converter 113 and the portion of stream 130 that flows into the first $CO_2$ conversion unit 114 compared to CASE 4C.

CASE 9D is a modified version of CASE 9C in which additional natural gas is supplied (here 420 mt/d vs 375 mt/d in CASE 9C) so that there is sufficient hydrogen available to fully consume all of the available biogenic carbon and maximize the production of 100% biogenic hydrocarbons, with a yield of 384 mt/d (approximately 2.87 times the conventional CASE 4A, process 100, value.) In this case, no biogenic $CO_2$ is sequestered, as reflected by the fact that 100% of the $CO_2$ by-product 116 is fossil-derived $CO_2$. It is not possible to further increase the hydrocarbon output in this process 200B with further increases in natural gas input as there are no more biogenic carbon atoms to route to the conversion stage 226 for conversion to product and none of the fossil-derived carbon from the natural gas input reaches the conversion stage 226. This contrasts with process 200A, in which increasing natural gas adds carbon to the conversion stage 226, driving increased output (with a correspondingly higher GHG LCA product that also has a correspondingly higher share of fossil atomic carbon.). The GHG LCA of the hydrocarbons produced in CASE 9D is about 27% of the fossil baseline—a small increase over the CASE 9C value of 20%. For CASE 9D the % of net atomic carbon input into the process from natural gas is 45%, the product atomic carbon yield per sustainable atomic carbon input into the process is 0.85, and the product yield per dry solid sustainable carbon material input into the process is 0.50.

FIG. 10 is a flow sheet comparing the previously introduced conventional solid sustainable carbon material conversion process 100, simulated in CASE 5A, and two embodiments of the solid sustainable carbon material conversion process 200B, parameterized as set forth above and configured for the production of ammonia. FIG. 10 additionally shows the GHG LCA of the produced ammonia, and a number of embodiment metrics. In the embodiment labeled "CASE 10B" referring to an embodiment of process 200B, 1400 mt/d of natural gas is supplied to the hydrocarbon converter 210B via the hydrocarbon material 206, and the total ammonia product output increases to 1988 mt/d. The process performance and process metrics of CASE 10B are approximately the same as in CASE 5B, corresponding to process 200A.

In the embodiment labeled CASE 10C referring to an embodiment of process 200B, 3000 mt/d of natural gas is supplied to the hydrocarbon converter 210B via the hydrocarbon material 206, and the total ammonia product output increases to 3457 mt/d. The process performance and process metrics of CASE 10C are approximately the same as in CASE 5C, corresponding to process 200A. This finding that process 200B and 200A have approximately the same performance and metrics is consistent with the understanding that process 200B is functionally equivalent to process 200A but without routing any fossil-derived carbon into the conversion feeds 124 and 224. Since each of the conversion feeds 124 and 224 entering the respective conversion stages 126 and 226 is pure hydrogen in the case of ammonia production, there is no practical difference between the two processes, except, as discussed above, in the degree of module integration. Accordingly, other things being equal, it would be normally expected that process 200A would be less costly to operate than process 200B (or 200C).

As in process 200C, it is possible to configure versions of each of CASE 8B, 8C, 8D, 9B, 9C, 9D, 10B, and 10C in which the $CO_2$ recycle 118 is omitted, and $CO_2$ is supplied to the gasification stage 104 from the biogenic $CO_2$ source 260 at the simulated rate of 135 mt/d. As previously noted, the biogenic $CO_2$ source 260 may be a direct air capture system or a carbon capture system configured to remove biogenic $CO_2$ from an industrial process.

The improved integration offered by process 200C over 200B (via the use of a single $CO_2$ removal unit 214 in process 200C rather than two $CO_2$ removal units 114 and 214B in process 200B) would be expected to reduce total plant capital cost and operating cost. In most cases it would be expected that providing biogenic $CO_2$ source 260 and $CO_2$ conduit 218 would be more expensive than providing $CO_2$ recycle 118, but the higher integration of process 200C may offset the higher cost of employing process 200B so as to ensure fossil/biogenic carbon segregation. It is also noteworthy that in process 200C, the net total amount of sustainable atomic carbon input can be increased for the same size gasifier and the same solid sustainable carbon material input due to the additional biogenic $CO_2$ input, offering an opportunity (when producing carbon containing products like methanol and hydrocarbons) to increase the total amount of 100% biogenic carbon product output.

FIG. 11 is a flow sheet comparing three embodiments, CASE 11B, CASE 11C, and CASE 11D, of solid sustainable carbon material conversion process 200C, each parameterized as set forth above and configured for the production of methanol, and each corresponding to adaptations of CASE 8B, CASE 8C, and CASE 8D respectively. FIG. 11 additionally shows the GHG LCA of the produced methanol, and a number of embodiment metrics. The key difference in CASE 11B, CASE 11C, and CASE 11D (process 200C) relative to CASE 8B, CASE 8C, and CASE 8D, respectively, (process 200B) is the removal of the $CO_2$ recycle, so that the 135 mt/d of $CO_2$ input to the gasifier 106 is provided as a net input to the process 200C, and is here assumed to be biogenic for simulation purposes. This increased inflow of sustainable carbon allows for increasing the productivity of each of CASE 11B, CASE 11C, and CASE 11D relative to the corresponding cases while otherwise maintaining the same GHG LCA for the end product. These increases in productivity are associated with increased natural gas supply to provide the additional hydrogen to react with this additional biogenic carbon. For these cases the % of net atomic carbon input into the process from natural gas is between 37% and 47%, the product atomic carbon yield per sustainable atomic carbon input into the process is between 0.72 and 0.94, and the product yield per dry solid sustainable carbon material input into the process is between 0.96 and 1.26.

FIG. 12 is a flow sheet comparing three embodiments, CASE 12B, CASE 12C, and CASE 12D, of solid sustainable carbon material conversion process 200C, each parameterized as set forth above and configured for the production of FT hydrocarbons, and each corresponding to adaptations of CASE 9B, CASE 9C, and CASE 9D respectively. FIG. 12 additionally shows the GHG LCA of the produced hydrocarbon, and a number of embodiment metrics. As in FIG. 11, the key difference in the cases shown in FIG. 12 is the removal of the $CO_2$ recycle in CASE 12B, CASE 12C, and CASE 12D, so that the 135 mt/d $CO_2$ input to gasifier 106 is provided as a net input, and is here assumed to be biogenic. This increased inflow of biogenic carbon allows for increasing the productivity of each of CASE 12B, CASE 12C, and CASE 12D relative to the corresponding cases, while otherwise maintaining the same GHG LCA for the end product. These increases in productivity are associated with increased natural gas supply to provide the additional hydrogen to react with this additional biogenic carbon. For these cases the % of net atomic carbon input into the process from natural gas is between 38% and 49%, the product atomic carbon yield per sustainable atomic carbon input into the process is between 0.71 and 0.94, and the product yield per dry solid sustainable carbon material input into the process is between 0.42 and 0.55.

Figure 13:
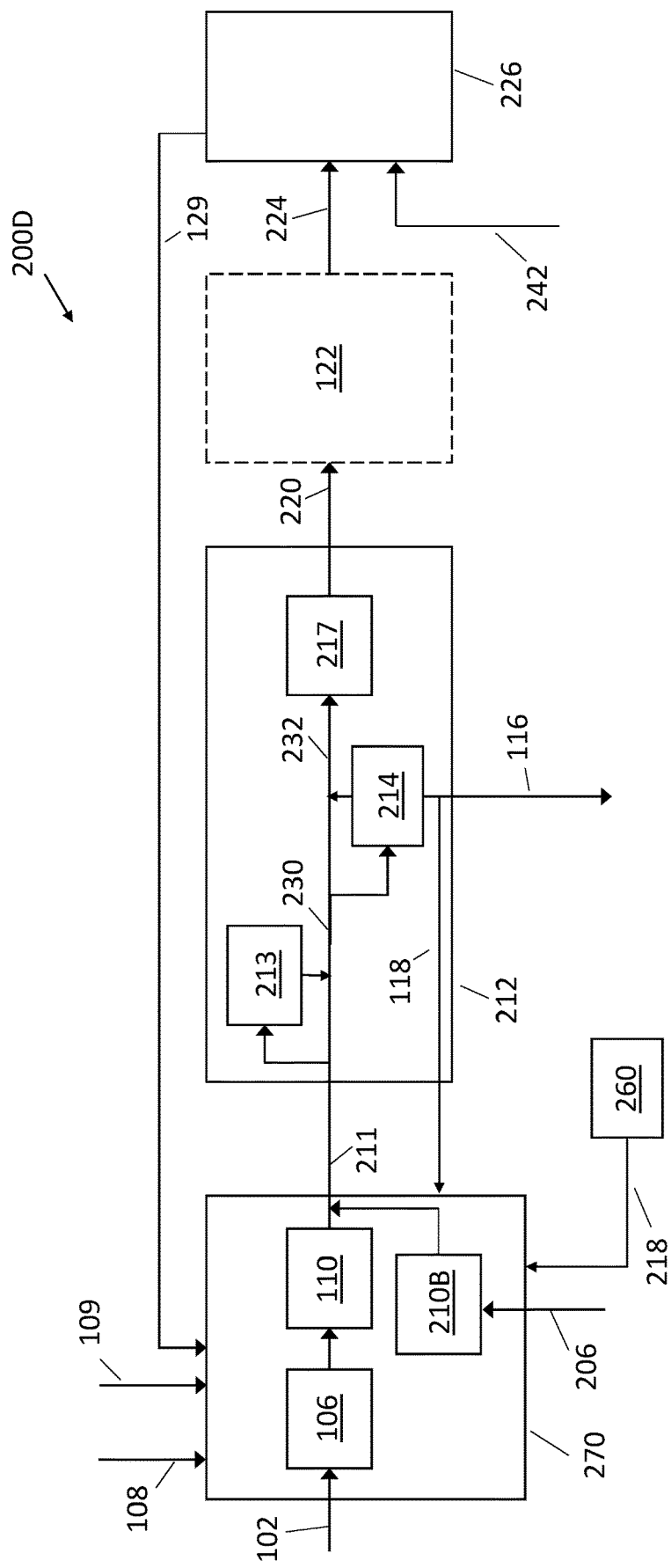
FIG. 13 is a process diagram of a solid sustainable carbon material conversion process according to another embodiment.

FIG. 13 is a process diagram of a solid sustainable carbon material conversion process 200D according to another embodiment. The process 200D is similar in many respects to the process 200A of FIG. 2, but with a different gasification stage 270 instead of the gasification stage 204. The gasification stage 270 includes the gasifier 106 and tar converter 110 to produce a first effluent from processing waste solid sustainable carbon material 102 and the hydrocarbon converter 210B to product a second effluent from processing the fossil-derived hydrocarbon material 206. The first and second effluents are combined to yield the gasification stage effluent 211, which is further processed in a manner similar to the rest of the process 200A of FIG. 2.

The solid sustainable carbon material conversion processes described herein use hydrocarbons derived from conventional sources to supplement carbon and hydrogen in the syngas produced by solid sustainable carbon material gasification. Such supplementation can boost yield of products from solid sustainable carbon material conversion processes, and where biogenic $CO_2$ formed from solid sustainable carbon material gasification is sequestered, still yield low, or even zero or negative GHG LCA products.

In general, the solid sustainable carbon material conversion processes described herein may be operated with a % of net atomic carbon input into the process from fossil-derived hydrocarbons of between 15% and 50% so as to produce carbon containing chemicals, for example methanol and hydrocarbons, with GHG LCA that ranges from modestly negative to modestly positive, including zero. Some processes described herein can use fossil-derived hydrocarbon to make hydrogen for an ammonia plant that uses solid sustainable carbon material as a feedstock. In general, the solid sustainable carbon material conversion processes described herein may be operated with a % of net atomic carbon input into the process from fossil-derived hydrocarbons of between 35% and 90% so as to produce carbon free chemicals, for example hydrogen or ammonia, with GHG LCA that ranges from modestly negative to modestly positive, including zero.

In general, each of the biomass conversion processes described herein may be operated as a single integrated facility that produces carbon-containing products with "well-to-wake" GHG LCA less than 20%, less than 10%, or less than 5% of the corresponding fossil baseline GHG LCA (based on reference values and a GHG LCA methodology consistent with the 2022 GREET model). These processes can be operated to produce a product atomic carbon yield per sustainable atomic carbon input into the process that is at least 0.45, at least 0.50, at least 0.60, at least 0.70, or at least 0.80. To calculate these values in the simulations of the processes 200B and 200C herein, the biogenic input carbon mass flow rate is 369 mt/d, the output carbon mass flow rate for methanol is equal to the methanol production rate multiplied by 12/32, and the output carbon mass flow rate for FT hydrocarbons is equal to the hydrocarbon production rate multiplied by 0.85 (utilizing the approximation that such hydrocarbons comprise about 85% carbon by weight.) In contrast to the above higher values, the product atomic carbon yield per sustainable atomic carbon input into the process of CASE 3A is just 0.31, reflecting the conventional solid sustainable carbon material conversion to methanol process. Similarly for FT hydrocarbons, the CASE 4A value is just 0.29. Thus the embodiments shown herein demonstrate that, contrary to conventional wisdom, it is possible to substantially boost carbon containing product yield through integration of fossil-derived natural gas conversion and solid sustainable carbon material gasification while also producing a very low, zero, or even negative GHG LCA product.

In general, each of the biomass conversion processes described herein may be operated as a single integrated facility that produces ammonia with GHG LCA less than 10%, less than 5%, or less than 2% of the corresponding fossil baseline GHG LCA (based on reference values and a GHG LCA methodology consistent with the 2022 GREET model). These processes can be operated to have a product yield per dry solid sustainable carbon material input into the process of 1.0, at least 2.0, at least 3.0, or at least 4.0. In contrast, the product yield per dry solid sustainable carbon material input into the process for CASE 5A is just 0.36, reflecting the conventional solid sustainable carbon material conversion to ammonia process. Thus the embodiments shown herein demonstrate that contrary to conventional wisdom, it is possible to substantially boost ammonia product yield through integration of fossil-derived natural gas conversion and solid sustainable carbon material gasification while also producing a very low, zero, or even negative GHG LCA product.

The processes disclosed herein for converting waste solid sustainable carbon materials into chemical products generally use an amount of additional hydrocarbon, such as natural gas, sourced from fossil sources to boost output of the chemical products for little additional capital cost. $CO_2$ produced by the conversion of raw materials into useable chemical precursors is sequestered or otherwise consumed to make the final products, so the GHG LCA of the produced final products can be much lower than similar products made in conventional ways, and the increased output of final products provides economy of scale to make such processes more attractive. In general, these processes use hydrocarbon at a mass flow rate that is at least about 15% of the dry weight mass flow rate of waste solid sustainable carbon material used. Where the final products are carbon-containing products, hydrocarbon conversion to CO and hydrogen is balanced with conversion of CO from biomass gasification into hydrogen and $CO_2$ to yield a syngas material, as a precursor to chemical production, that has a volumetric ratio of hydrogen to CO that is at least 2.0, and may be higher, for example 2.2, 2.5, or 3.0.

$CO_2$ produced by hydrocarbon and biomass conversion is mostly sequestered, for example in a subterranean facility (or any suitable facility), but some can be recycled and used to enhance gasification of the solid sustainable carbon material. In some cases, the hydrocarbon can be converted entirely to hydrogen and $CO_2$ and the waste solid sustainable carbon material can be converted entirely to hydrogen and $CO_2$, and the hydrogen can be used to make ammonia. In some cases, carbon from the hydrocarbon can be segregated from biogenic carbon so that the final chemical products contain only biogenic carbon. Where carbon from fossil sources is segregated from biogenic carbon, biogenic $CO_2$ can be used to enhance gasification, rather than recycling $CO_2$ that might contain fossil-derived carbon, so the final chemical products can remain free of fossil-derived carbon. Generally speaking, sequestering more $CO_2$ decreases environmental burden of all the processes described herein. In particular sequestering $CO_2$ from the fossil-derived hydrocarbon added to the processes is beneficial. For example, the processes described herein can be operated to sequester at least 90%, or at least 95%, or at least 99% of the carbon from the fossil-derived hydrocarbon material 206 as captured and sequestered $CO_2$. In some embodiments for producing carbon containing materials, at least 5%, but not more than 40%, of sustainable atomic carbon input from waste carbon containing material (e.g. waste solid biomass, waste solid sustainable carbon material) is sequestered in a sequestration facility.

As the various examples described herein show, in some embodiments sequestered $CO_2$ has a first component from sustainable carbon input and a second component from fossil-derived hydrocarbon. In some embodiments, the first component has a mass flow rate of $CO_2$ that is 44/12 times 90% of the mass flow rate of atomic carbon from the input fossil-derived hydrocarbon and the second component has a mass flow rate of $CO_2$ that is 44/12 times 5% of the mass flow rate of atomic carbon from the input solid sustainable carbon material. These components may flow separately to sequestration, or may be combined at any suitable point in a particular embodiment.

While the foregoing is directed to embodiments of one or more inventions, other embodiments of such inventions not specifically described in the present disclosure may be devised without departing from the basic scope thereof, which is determined by the claims that follow.

The invention claimed is:

1. A process for making organic chemical products from solid sustainable carbon materials, the process comprising:
   providing solid sustainable carbon material to a gasifier;
   gasifying the solid sustainable carbon material to produce a first stream comprising CO, $H_2$, $CO_2$, and a mixture of organic compounds;
   converting the organic compounds in the first stream, comprising partially oxidizing the organic compounds using a first converter, and hydrocarbon in a second stream, comprising partially oxidizing the hydrocarbon, using a second converter, the second stream comprising hydrocarbon derived from a fossil source, to CO, $H_2$, and $CO_2$, to form one or more gas streams comprising CO, $H_2$, and $CO_2$;
   converting at least a portion of CO in the one or more gas streams to $CO_2$ to increase $H_2$ in the one or more gas streams and to form one or more converted streams;
   separating $CO_2$ from the one or more converted streams to form a conversion feed;
   sequestering at least a portion of the separated $CO_2$ in an underground sequestration facility; and
   producing one or more organic chemical products from the conversion feed,
   wherein a % of net atomic carbon input into the process from fossil-derived sources is between 15% and 50%, and
   wherein the organic chemical products contain less than 10% carbon derived from a fossil source.

2. The process of claim 1, further comprising using a portion of the $CO_2$ separated from the one or more converted streams in gasifying the solid sustainable carbon material.

3. The process of claim 1, wherein the first stream has a first flow rate, the second stream has a second flow rate, and the second flow rate is at least about 20% of the first flow rate.

4. The process of claim 3, wherein the second flow rate is selected to provide a finished product with greenhouse gas emission life-cycle assessment no more than zero.

5. The process of claim 1, wherein at least one of the one or more converted streams has a volumetric ratio of $H_2$ to CO that is at least 2.0.

6. The process of claim 1, wherein the one or more organic chemical products are free of fossil-derived carbon.

7. The process of claim 1, wherein the converting the organic compounds in the first stream and the hydrocarbon in the second stream to CO, $H_2$, and $CO_2$ is performed in the same converter.

8. The process of claim 7, wherein a portion of the separated $CO_2$ is used to gasify the solid sustainable carbon material, to convert the organic compounds in the first stream, to convert the hydrocarbons in the second stream, or any combination thereof.

9. The process of claim 1, wherein
the converting the organic compounds in the first stream forms a first gas stream of the one or more gas streams,
the converting the hydrocarbon in the second stream forms a second gas stream of the one or more gas streams,
the converting at least a portion of CO in the one or more gas streams to $CO_2$ comprises converting CO in the first gas stream to $CO_2$ to form a first converted stream of the one or more converted streams, and
the converting at least a portion of CO in the one or more gas streams to $CO_2$ comprises converting CO in the second gas stream to $CO_2$ to form a second converted stream of the one or more converted streams.

10. The process of claim 9, wherein
the separating $CO_2$ from the one or more converted streams to form a conversion feed comprises separating $CO_2$ from the first converted stream to form a first conversion feed,
the separating $CO_2$ from the one or more converted streams to form a conversion feed comprises separating $CO_2$ from the second converted stream to form a second conversion feed, and
further comprising combining the first conversion feed and the second conversion feed to form the conversion feed.

\* \* \* \* \*